US012133119B2

(12) United States Patent
Nguyen et al.

(10) Patent No.: US 12,133,119 B2
(45) Date of Patent: Oct. 29, 2024

(54) SENSING FOR UNICAST SIDELINK COMMUNICATION

(71) Applicant: QUALCOMM Incorporated, San Diego, CA (US)

(72) Inventors: Tien Viet Nguyen, Bridgewater, NJ (US); Gabi Sarkis, San Diego, CA (US); Kapil Gulati, Belle Mead, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/457,345

(22) Filed: Dec. 2, 2021

(65) Prior Publication Data
US 2022/0191744 A1  Jun. 16, 2022

Related U.S. Application Data

(60) Provisional application No. 63/126,297, filed on Dec. 16, 2020.

(51) Int. Cl.
*H04W 28/26* (2009.01)
*H04W 72/20* (2023.01)
*H04W 92/18* (2009.01)

(52) U.S. Cl.
CPC ........... *H04W 28/26* (2013.01); *H04W 72/20* (2023.01); *H04W 92/18* (2013.01)

(58) Field of Classification Search
CPC ..... H04W 28/26; H04W 72/20; H04W 92/18; H04W 74/0816; H04W 72/02; H04W 72/25
See application file for complete search history.

(56) References Cited

U.S. PATENT DOCUMENTS

2022/0279536 A1* 9/2022 Khsiba ................ H04W 72/569
2023/0337189 A1* 10/2023 Yoshioka .............. H04W 28/26

FOREIGN PATENT DOCUMENTS

EP         3996463 A1 *  5/2022   ............. H04W 4/40

* cited by examiner

*Primary Examiner* — Cheikh T Ndiaye
(74) *Attorney, Agent, or Firm* — Arent Fox, LLP

(57) ABSTRACT

Apparatus, methods, and computer-readable media for facilitating improvement in sensing for unicast sidelink communication are disclosed herein. An example method for wireless communication at a first user equipment (UE) includes receiving, from a second UE over a sidelink channel, a first transmission comprising sidelink control information (SCI). In some aspects, the SCI indicates a resource reservation of the second UE. The method includes obtaining measurements of the first transmission and determining whether the measurements exceed a reference threshold. The method includes determining whether the SCI includes an indication that the second UE is following a first resource recommendation of a third UE that is an intended receiver of the second UE when the measurements exceed the reference threshold. The method also includes ignoring the resource reservation of the second UE when the SCI includes the indication that the UE is following the first resource recommendation of the third UE.

30 Claims, 20 Drawing Sheets

SENSING FOR UNICAST SIDELINK COMMUNICATION

CROSS REFERENCE TO RELATED APPLICATION(S)

This application claims the benefit of U.S. Provisional Patent Application Ser. No. 63/126,297, entitled "IMPROVEMENT IN SENSING FOR UNICAST SIDELINK COMMUNICATION" and filed on Dec. 16, 2020, which is expressly incorporated by reference herein in its entirety.

BACKGROUND

Technical Field

The present disclosure relates generally to communication systems, and more particularly, to improvement in sensing for unicast sidelink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For sidelink networks with groupcast (or broadcast) transmission configurations, a transmitter UE may sense a sidelink channel by using transmitter-side sensing information of any nearby sidelink transmitters including receiver-side sensing information of intended sidelink receivers. Since there may be multiple sidelink receivers around a sidelink transmitter in the groupcast transmission configuration, the transmitter-side sensing may assume a worst-case scenario where at least one of the intended sidelink receivers is located between two sidelink transmitters. On the other hand, unicast transmission configurations may only benefit from the use of receiver-side sensing (e.g., ignoring transmitter-side sensing) for the sidelink channel sensing. This may be because the likelihood of an intended sidelink receiver being located between two unicast sidelink transmitters is significantly lower than that of groupcast transmission configurations. Also, transmitter-side sensing information may be less desirable in unicast transmission configurations with heavy load scenarios due to an "exposed node," since resources may be over excluded. In this regard, transmission protection in unicast transmission configurations is primarily achieved by using the receiver-side sensing information with lesser emphasis on transmitter-side sensing information. However, issues in transmission protection may arise in mixed cast type sidelink environments. For example, a groupcast transmission within sidelink networks may receive insufficient protection, where a first sidelink transmitter in a unicast configuration may obtain receiver-side sensing information of its receiver and deemphasize transmitter-side sensing by ignoring the transmitter-side sensing of a second sidelink transmitter in a groupcast configuration, which may lead to an occurrence of actual interference between the sidelink transmitters. This de-emphasis in transmitter-side sensing is undesirable as it results in lesser protection to transmitters in mixed cast type networks.

The subject technology provides for facilitating improvement in sensing for unicast sidelink communication by allowing a UE to transmit its sidelink signaling to its intended sidelink receivers at a same time as another sidelink transmitter without wasting resources. In some aspects, the UE can ignore a resource reservation included in an incoming first-stage SCI (e.g., SCI-1) if the UE is following its sidelink receiver (or other UE) recommendation and the SCI-1 indicates that the other sidelink transmitter is following its receiver (or other UE) recommendation. In other aspects, the UE can ignore resource reservation information included in the incoming SCI-1 if the sensed transmitter UE is following its receiver (or other UE) recommendation and the SCI-1 transmitter cast type is unicast. In some aspects, the UE may decode both SCI-1 and SCI-2 to determine the transmitter cast type. In still other aspects, the UE can ignore the resource reservation included in incoming SCI-1 based primarily on the indication that the other sidelink transmitter is following its receiver (or other UE) recommendation. In some aspects, a larger RSRP threshold may be applied to exclude overlapping resources. The larger RSRP threshold can be (pre) configurable and based on a resource reservation priority. In other aspects, a RSRP threshold delta may be applied to exclude overlapping resources. In some aspects, the RSRP threshold delta can be (pre) configurable and based on the resource reservation priority. In some aspects, the UE can add an indication into the SCI to indicate that the UE is following resource indicated by its receiver (or another UE). In some aspects, the indication can be added using a reserved bit location within the first-stage SCI.

In an aspect of the disclosure, a method, a computer-readable medium, and an apparatus are provided. The apparatus may receive, from a second UE over a sidelink channel, a first transmission comprising SCI indicating a resource reservation of the second UE. The apparatus may obtain one or more measurements of the first transmission. The apparatus may determine whether the one or more measurements exceed a reference threshold. The apparatus may determine whether the SCI includes an indication that the second UE is following a first resource recommendation of a third UE that is an intended receiver of the second UE when the one or more measurements exceed the reference threshold. The apparatus may ignore the resource reservation of the second UE when the SCI includes the indication that the UE is following the first resource recommendation of the third UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
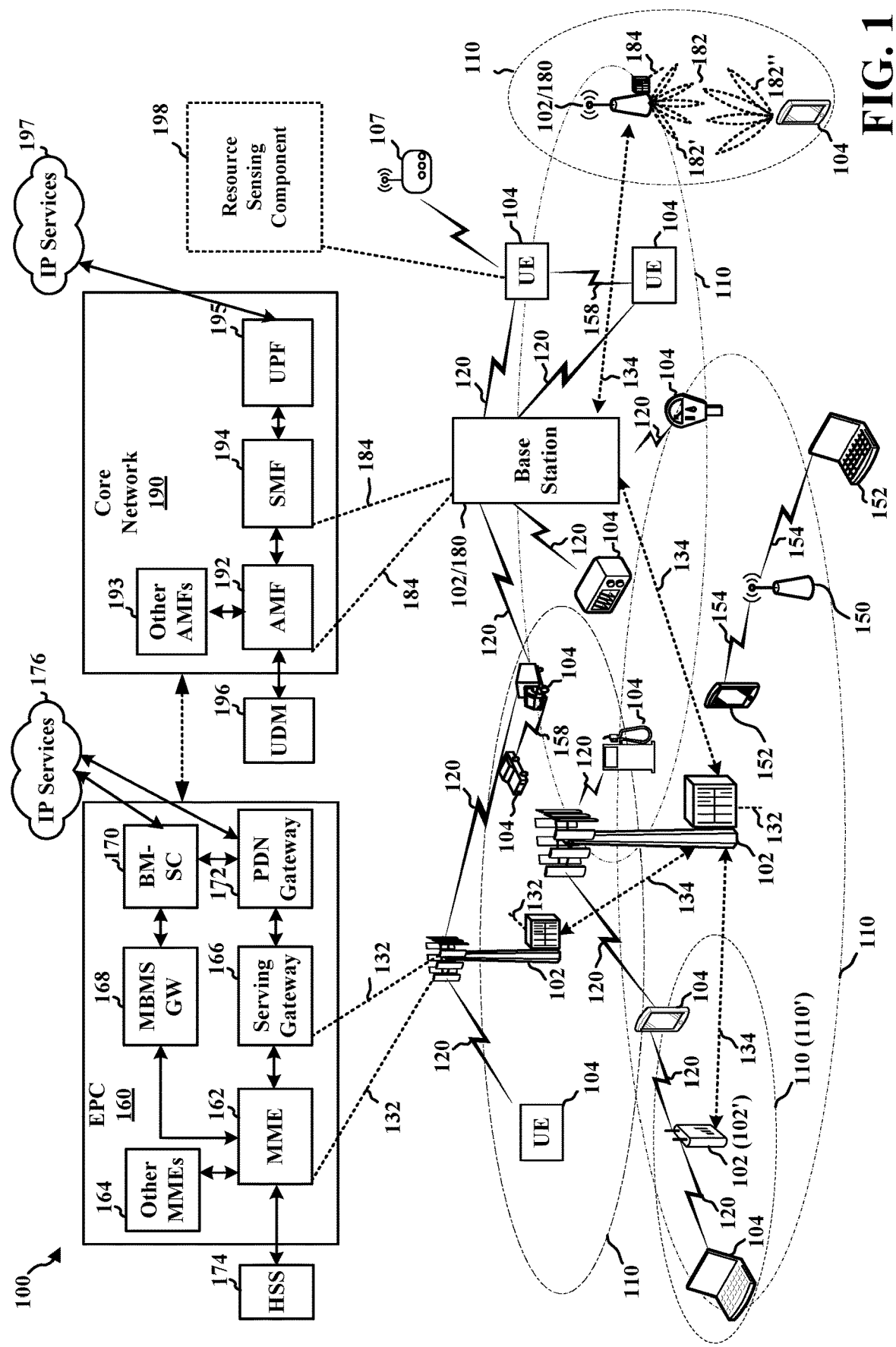
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

In sidelink communication, control information may be indicated by a transmitting UE in multiple SCI parts. The SCI may indicate resources that the UE intends to use, for example, for a sidelink transmission. The UE may transmit a first part of control information indicating information about resource reservation in a physical sidelink control channel (PSCCH) region, and may transmit a second part of the control information in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, control information may be indicated through a combination of the first SCI part included in the PSCCH region (e.g., the SCI-1) and the second SCI part included in the PSSCH region (e.g., the SCI-2).

As used herein, the term "transmitter-side sensing information" may refer to sensing information obtained by a transmitter of a packet performing the sensing, and the term "receiver-side sensing information" may refer to sensing information obtained by a receiver performing the sensing that includes a resource selection recommendation to a transmitter.

For sidelink networks with groupcast (or broadcast) transmission configurations, a transmitter UE may sense a sidelink channel by using transmitter-side sensing information of any nearby sidelink transmitters including receiver-side sensing information of intended sidelink receivers. Since there may be multiple sidelink receivers around a sidelink transmitter in the groupcast transmission configuration, the transmitter-side sensing may assume a worst-case scenario where at least one of the intended sidelink receivers is located between two sidelink transmitters. On the other hand, unicast transmission configurations may only benefit from the use of receiver-side sensing (e.g., ignoring transmitter-side sensing) for the sidelink channel sensing. This may be because the likelihood of an intended sidelink receiver being located between two unicast sidelink transmitters is significantly lower than that of groupcast transmission configurations. Also, transmitter-side sensing information may be less desirable in unicast transmission configurations with heavy load scenarios due to an "exposed node," since resources may be over excluded. In this regard, transmission protection in unicast transmission configurations is primarily achieved by using the receiver-side sensing information with lesser emphasis on transmitter-side sensing information. However, issues in transmission protection may arise in mixed cast type sidelink environments. For example, a groupcast transmission within sidelink networks may receive insufficient protection, where a first sidelink transmitter in a unicast configuration may obtain receiver-side sensing information of its receiver and deemphasize transmitter-side sensing by ignoring the transmitter-side sensing of a second sidelink transmitter in a groupcast configuration, which may lead to an occurrence of actual interference between the sidelink transmitters. This deemphasis in transmitter-side sensing is undesirable as it results in lesser protection to transmitters in mixed cast type networks.

The subject technology provides for facilitating improvement in sensing for unicast sidelink communication by allowing a UE to transmit its sidelink signaling to its intended sidelink receivers at a same time as another sidelink transmitter without deemphasizing in transmitter-side sensing information. In some aspects, the UE can ignore a resource reservation included in an incoming first-stage SCI (e.g., SCI-1) if the UE is following its sidelink receiver (or other UE) recommendation and the SCI-1 indicates that the other sidelink transmitter is following its receiver (or other UE) recommendation. In other aspects, the UE can ignore resource reservation information included in the incoming SCI-1 if the sensed transmitter UE is following its receiver (or other UE) recommendation and the SCI-1 transmitter cast type is unicast. In some aspects, the UE may decode both SCI-1 and SCI-2 to determine the transmitter cast type. In still other aspects, the UE can ignore the resource reservation included in incoming SCI-1 based primarily on the indication that the other sidelink transmitter is following its receiver (or other UE) recommendation. In some aspects, a larger RSRP threshold may be applied to exclude overlapping resources. The larger RSRP threshold can be (pre) configurable and based on the resource reservation priority. In other aspects, a RSRP threshold delta may be applied to exclude overlapping resources. In some aspects, the RSRP threshold delta can be (pre) configurable and based on the resource reservation priority. In some aspects, the UE can add an indication into the SCI to indicate that the UE is following resource indicated by its receiver (or another UE). In some aspects, the indication can be added using a reserved bit location within the first-stage SCI.

In some examples, a UE 104 may be configured to manage one or more aspects of wireless communication by facilitating sensing of resources for improvement in sensing for unicast sidelink communication. As an example, in FIG. 1, the UE 104 may include a resource sensing component 198. In certain aspects, the resource sensing component 198 may be configured to receive, from a second UE over a sidelink channel, a first transmission comprising SCI indicating a resource reservation of the second UE. The resource sensing component 198 may also be configured to obtain one or more measurements of the first transmission and determine whether the one or more measurements exceed a reference threshold. The resource sensing component 198 may be configured to determine whether the SCI includes an indication that the second UE is following a first resource recommendation of a third UE that is an intended receiver of the second UE when the one or more measurements exceed the reference threshold. Additionally, the resource sensing component 198 may be configured to ignore the resource reservation of the second UE when the SCI includes the indication that the UE is following the first resource recommendation of the third UE.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

Figure 2:
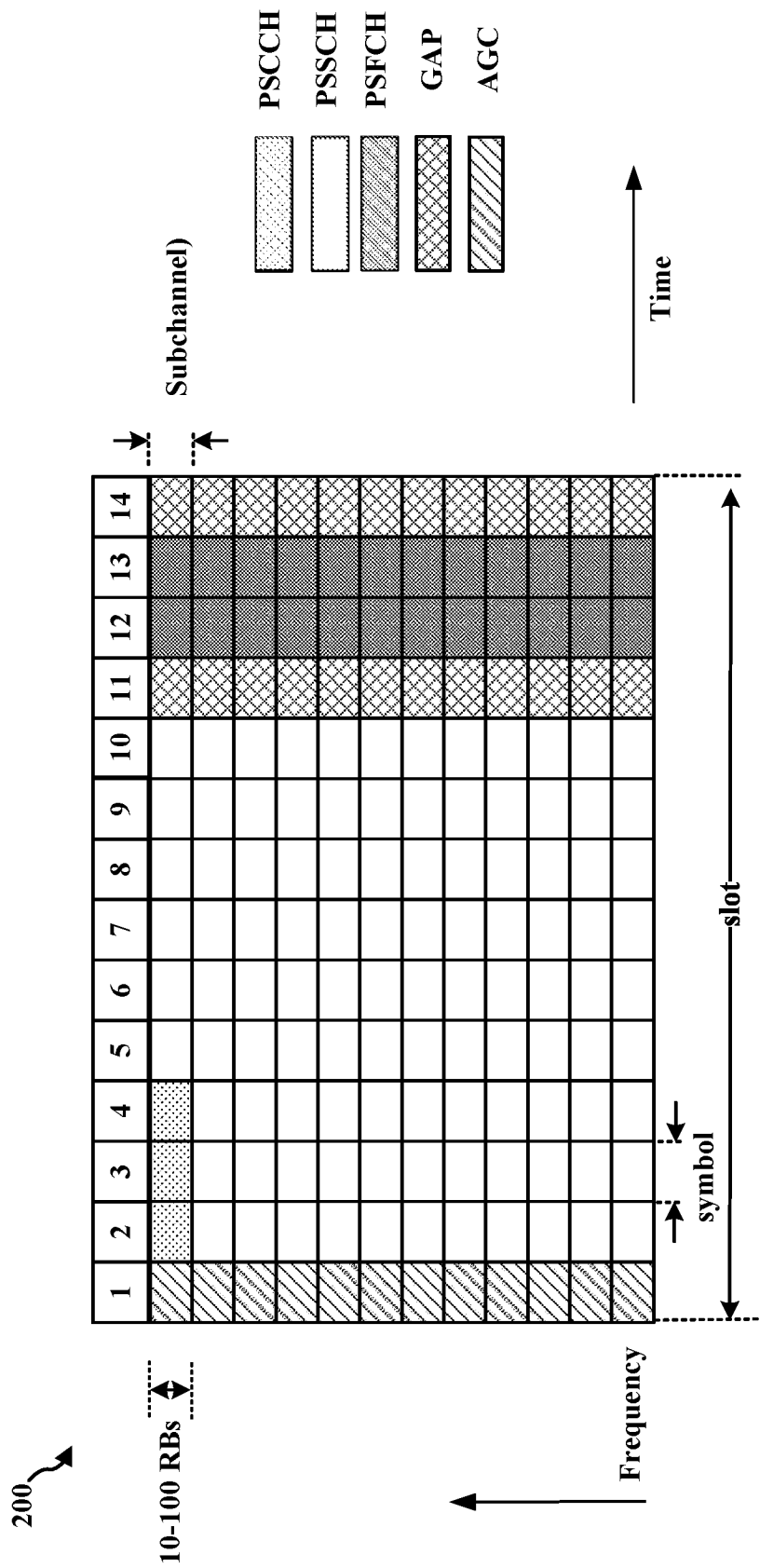
FIG. 2 illustrates example aspects of a sidelink slot structure.

FIG. 2 illustrates example diagram 200 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI).

Figure 12:
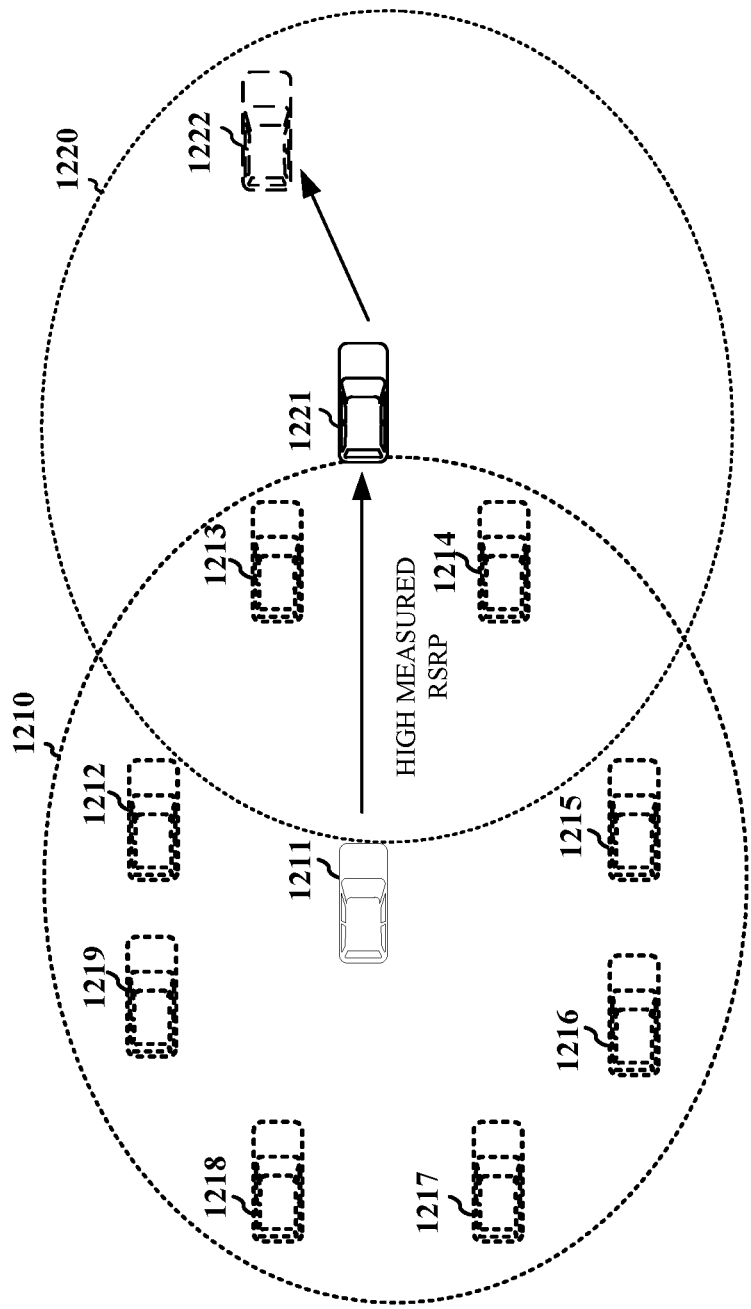

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 200 also illustrates multiple subchannels, where each subchannel may include multiple RBs. For example, one subchannel in sidelink communication may include 10-100 RBs. As illustrated in FIG. 2, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 2 also illustrates symbol(s) that may include PSSCH. The symbols in FIG. 2 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 12, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 12, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 2.

Figure 3:
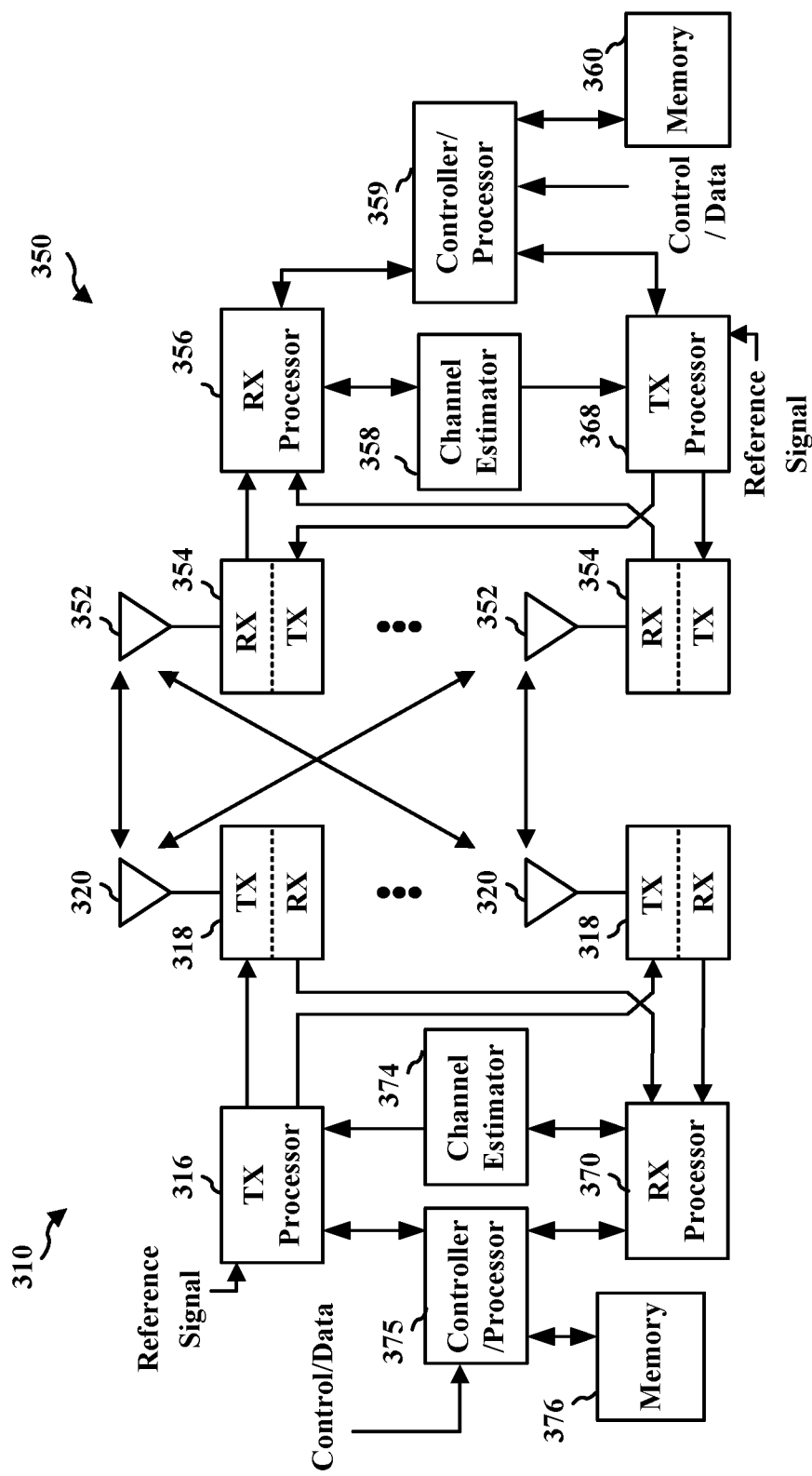
FIG. 3 is a diagram illustrating an example of a first device and a second device involved in sidelink communication.

FIG. 3 is a block diagram of a first wireless communication device 310 in communication with a second wireless communication device 350. The communication may be based on sidelink, e.g., using a PC5 interface. In some examples, the devices 310 and 350 may communicate based on V2X or other D2D communication. The devices 310 and the 350 may include a UE, an RSU, a base station, etc. In some examples, the device 310 may be a UE and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the resource sensing component 198 of FIG. 1.

Figure 4:
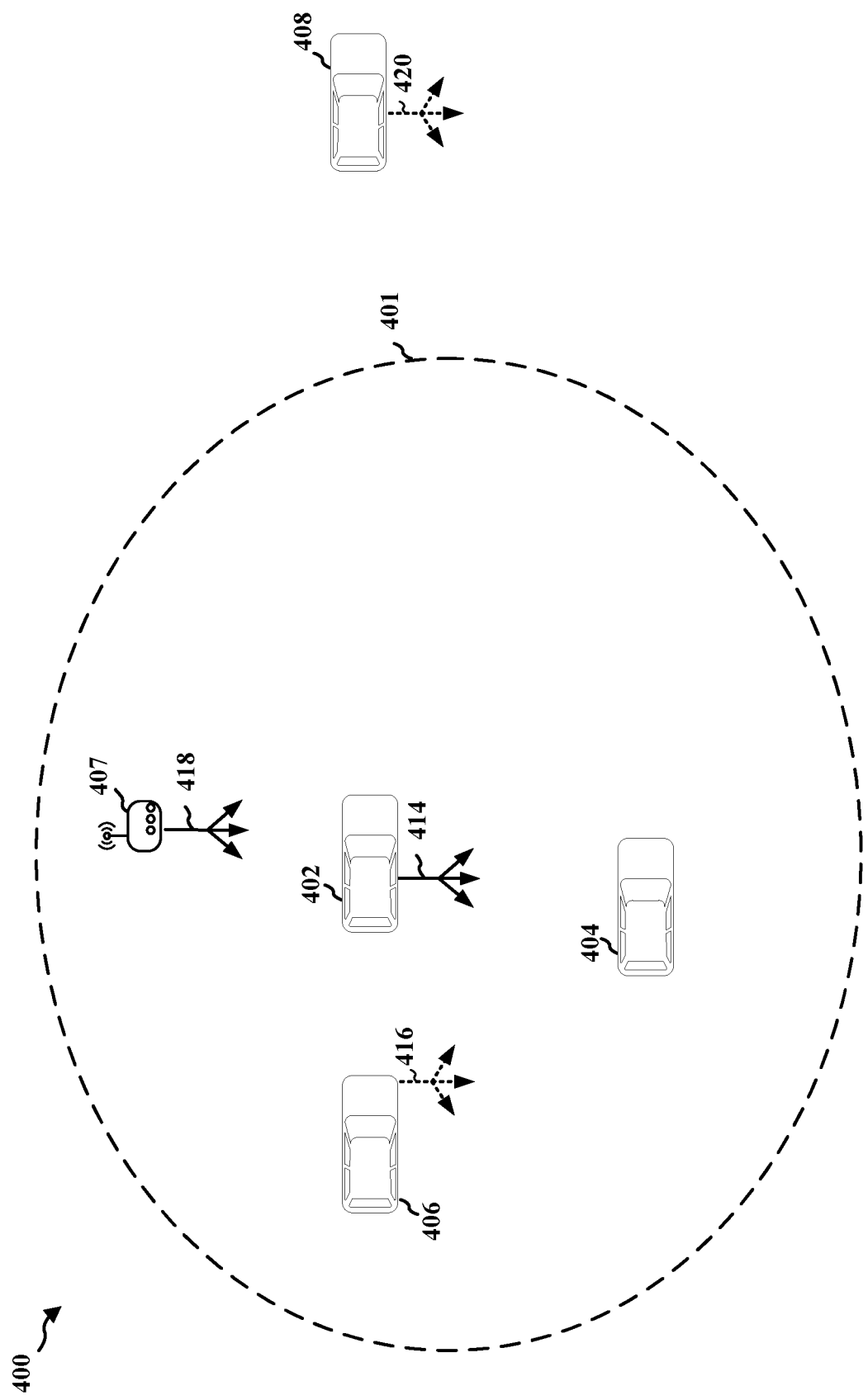
FIG. 4 illustrates an example of sidelink communication between wireless devices, in accordance with one or more of aspects of the present disclosure.

FIG. 4 illustrates an example 400 of sidelink communication between wireless devices. The communication may be based on a slot structure comprising aspects described in connection with FIG. 2 or another sidelink structure. Although the example in FIG. 4 is described for the UEs 402, 404, 406, 408, aspects may be applied to other wireless devices configured for communication based on sidelink, such as an RSU, an IAB node, etc. As illustrated in FIG. 4, a transmitting UE 402 may transmit a transmission 414 comprising a control information (e.g., sidelink control information (SCI)) and/or a corresponding data channel, that may be received by receiving UEs 404, 406, 408. The SCI may include information for decoding the corresponding data and may also be used by receiving device to avoid interference by refraining from transmitting on the occupied resources during a data transmission. For example, the SCI may reserve resources for sidelink communication. The number of TTIs, as well as the RBs that will be occupied by the data transmission, may be indicated in SCI from the transmitting device. The UEs 402, 404, 406, 408 may each be capable of operating as a transmitting device in addition to operating as a receiving device. Thus, the UEs 406, 408 are illustrated as transmitting transmissions 416 and 420. The transmissions 414, 416 or 420 may be broadcast or multicast to nearby devices. For example, the UE 402 may transmit communication intended for receipt by other UEs within a range 401 of the UE 402. In other examples, the transmissions 414, 416, or 418 may be groupcast to nearby devices that a member of a group. In other examples, the transmissions 414, 416, or 420 may be unicast from one UE to another UE. Additionally or alternatively, the RSU 407 may receive communication from and/or transmit communication 418 to the UEs 402, 404, 406, 408.

The UE 402, 404, 406, 408 and/or the RSU 407 may include a resource reservation component, similar to the resource sensing component 198 described in connection with FIG. 1.

Resource allocation refers to how a resource is allocated to a device to use for transmitting a packet. In sidelink communication, resource allocation may be performed in a centralized manner (Mode 1) or a distributed manner (Mode 2). When operating using Mode 1, resource allocations for sidelink communication are determined by a base station. For example, the base station may transmit an indication to a UE that indicates the resources that are allocated to the UE to use to transmit sidelink communication (e.g., sidelink data packets to other UEs). When operating using Mode 2, the resource allocations for sidelink communication are determined by the communicating UE. For example, a transmitting UE may autonomously determine resource allocations for transmitting sidelink control and data to one or more receiving UEs. When operating using Mode 2 (e.g., in a distributed manner), the transmitting UE may determine the resources to use for communicating from a resource pool. A resource pool refers to a collection of time and/or frequency resources on which sidelink communication may occur.

As shown in FIG. 4, a transmitter (Tx) UE 402 and a receiver (Rx) UE 404 may communicate with one another via a sidelink. In some sidelink modes, a base station 102/180 may communicate with the Tx UE 402 via a first access link (not shown). Additionally, or alternatively, in some sidelink modes, the base station 102/180 may communicate with the Rx UE 404 via a second access link (not shown). The Tx UE 402 and/or the Rx UE 404 may correspond to one or more UEs described elsewhere herein, such as the UE 104 of FIG. 1. Thus, a direct link between UEs 104 (e.g., via a PC5 interface) may be referred to as a sidelink, and a direct link between a base station 102/180 and a UE 104 (e.g., via a Uu interface) may be referred to as an access link. Sidelink communications may be transmitted via the sidelink, and access link communications may be transmitted via the access link. An access link communication may be either a downlink communication (from a base station 102/180 to a UE 104) or an uplink communication (from a UE 104 to a base station 102/180).

As described above, the UE 402 may operate in Mode 1, in which resource selection and/or scheduling is performed by the base station 102/180. That is, in Mode 1, the base station 102/180 assigns resources for transmitting sidelink communications. In particular, the base station 102/180 may transmit downlink control information (DCI) (e.g., in DCI format 3_0) that indicates a resource allocation (e.g., time and/or frequency resources) and/or a transmission timing. In Mode 1, a MCS value for sidelink transmissions may be selected by a UE 402 (e.g., within limits set by the base station 102/180). Moreover, Mode 1 may support dynamic grants or configured grants for scheduling sidelink transmissions. The configured grants may be type 1 (e.g., which may be activated by the base station 102/180 via radio resource control (RRC) signaling) or type 2.

As described above, the UE 402 may operate in Mode 2, in which resource selection and/or scheduling is performed by the UE 402. That is, the transmitting UE 402 may autonomously determine resources for sidelink transmissions. In this case, the transmitting UE 402 may perform channel sensing by performing blind decoding of all PSCCH channels in order to determine resources that are reserved for sidelink transmissions (e.g., by other transmitting UEs). In this way, the transmitting UE 402 may determine available resources, which may be reported to an upper layer of the transmitting UE 402 where resource usage is determined. The receiving UE 404 operates according to the same behavior in Mode 1 or Mode 2. In some aspects, the UE 402 may perform resource selection and/or scheduling by sensing channel availability for transmissions. For example, the UE 402 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

The radio resource allocation for a sidelink communication may be based on resource reservations. For instance, when a UE is preparing to transmit data on sidelink, the UE may first determine whether resources are reserved by other UEs. Then, the UE may reserve resources from the remaining unreserved resources that are available.

Figure 5:
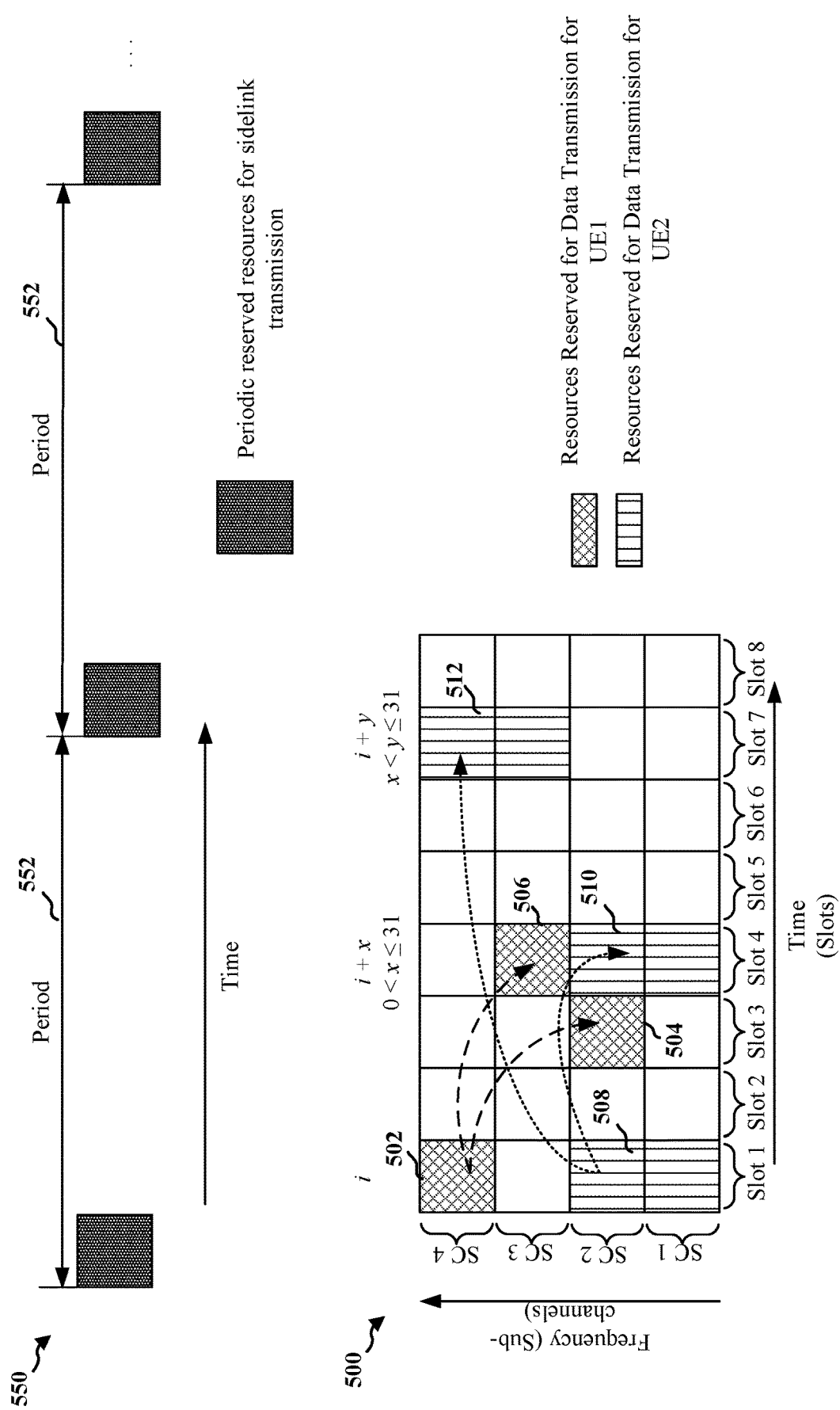
FIG. 5 is a diagram illustrating an example of resource reservations, in accordance with one or more of aspects of the present disclosure.

FIG. 5 is a diagram 500 illustrating an example of resource reservations for sidelink transmissions. The resource allocation for each UE may be in units of one or more subchannels in the frequency domain (e.g., subchannels SC 1 to SC 4), and may be based on one time slot in the time domain. The UE may also use resources in the current slot to perform a first transmission, and may reserve resources in future slots for retransmissions. In this example, up to two different future slots may be reserved by the UEs (e.g., UE1 and UE2) for retransmissions. The resource reservation may be limited to a window of pre-defined slots and subchannels, such as an example eight time slots by four subchannels window, as shown in diagram 500, which provides 32 available resource blocks in total. This example window may also be referred to as a "resource selection window." Each resource block in the resource selection window may be used to transmit both data and control information together.

FIG. 5 also illustrates an example of time frequency resources that may be available for sidelink communication. A resource pool may be either preconfigured (e.g., preloaded on a UE), configured by a base station, or otherwise determined by the UE. In some examples, a transmitting UE may randomly select resources from a resource pool for a transmission. In such examples, receiving UEs may continuously monitor candidate resources to receive a communication. Additionally, in some examples, if a nearby UE randomly selects the same resource, a collision or interference may occur.

In some examples, a UE may use historical resource utilization of other UEs to predict future activity. For example, by identifying that a first UE transmits periodically and what resources the first UE uses when transmitting, a second UE may determine on which resources future transmissions by the first UE may occur and also when they may occur. FIG. 5 also illustrates an example of period resource 550 that may be reserved by a UE for sidelink communication. Thus, by "listening" to other UE activity in the past (e.g., historical resource utilization), the second UE may predict future activity of the other UEs and can select a resource to use for a transmission that is less likely to result in a collision and/or interference.

However, it may be appreciated that for the second UE to identify historical resource utilization, the second UE may operate in an "always-on" mode to facilitate sensing or receiving of transmission by the other UEs. The continual monitoring by the second UE increases power consumption or processing resources in order to identify historical resource utilization and to predict future activity.

In some examples, a UE may perform partial sensing for determining historical resource utilization of other UEs. When performing partial sensing, the UE may selectively sense a subset of resources and, thus, may reduce power consumption in comparison to monitoring the set of resources. However, partial sensing may not be effective when transmissions by other UEs are not periodic. For example, a UE employing partial sensing may miss information about aperiodic transmissions and, thus, may be unable to accurately predict future activity of the other UEs based on a determined historical resource utilization.

In one example, a first UE ("UE1") may reserve a subchannel (e.g., SC 4) in a current slot (e.g., time slot 1) for an initial data transmission (e.g., resource 502), and may reserve additional future slots within the resource selection window for data retransmissions (e.g., resources 504, 506). For example, UE1 may reserve a subchannel SC 2 at time slot 3 (e.g., the resource 504) for a first future retransmission and may reserve a subchannel SC 3 at time slot 5 (e.g., the resource 506) for a second future retransmission, as shown by FIG. 5. UE1 may then transmit information regarding which resources are being used and/or reserved by UE1 to other UE(s), such as by including reservation information in a reservation resource field of the SCI (e.g., a first stage SCI). In some examples, the UE may be configured to use the SCI to reserve one, two, or three transmissions. In some examples, a maximum number of reservations allowed for a UE may be pre-configured for the UE. For example, a UE may be pre-configured to reserve up to three transmissions within a resource selection window.

As illustrated by FIG. 5, a second UE ("UE2") may also reserve resources in subchannels SC 1 and SC 2 at time slot 1 (e.g., resource 508) for a current data transmission. UE2 may also reserve subchannels SC 1 and SC 2 at time slot 4 (e.g., resource 510) to use for transmitting a first data retransmission, and may reserve subchannels SC 3 and SC 4 at time slot 7 (e.g., resource 512) to use for transmitting a second data retransmission, as shown by FIG. 5. Similar to the example of UE1, UE2 may then transmit information regarding the resource usage and/or reservation information to other UE(s), such as by using the reservation resource field in SCI. In some examples, a UE may be configured to make reservations using a same number of subchannels (e.g., bandwidth). For example, the resources 502, 504, 506 reserved by UE1 have a same number of subchannels (e.g., 1), and the resources 508, 510, 512 reserved by UE2 have a same number of subchannels (e.g., 2). However, the starting subchannel for each reserved resource may be different. For example, the initial data transmission may start at subchannel SC 4, the first future retransmission may start at subchannel SC 2, and the second future retransmission may start at subchannel SC3, etc.

When a UE (e.g., sidelink transmitting UE) is using a first resource 508 for transmission at time slot i in a period (such as period 552 illustrated in FIG. 5), the UE may reserve two more resources within the same period, such as a first future resource 510 at time slot i+x and a second future resource 512 at time slot i+y. Each of the reserved resources 508, 510, 512 may be associated with a number z of subchannels. For example, if the period has 32 slots with slot index 0 to 31, the UE may transmit using the first resource 508 at time slot 0 with z subchannels, and may reserve the first future resource 510 with z subchannels at time slot i+x, where x is 0<x≤31. The UE may also reserve the second future resource 512 with z subchannels at time slot i+y, where y is x<y≤31. Table 1 (below) illustrates example reservations signaled by the SCI of the UE in time slot i corresponding to FIG. 5.

TABLE 1

Reservations Signaled By An SCI In Time Slot i

| Reservation | Number of Subchannels | Time Slot |
| --- | --- | --- |
| 1 | z | i |
| 2 | z | i + x: 0 < x ≤ 31 |
| 3 | z | i + y: x < y ≤ 31 |

The UE may use the first reserved future resource 510 and the second reserved future resource 512 for retransmission, such as when a first transmission using the first resource 508 fails. The UE may additionally or alternatively use one or both of the reserved future resources 510, 512 for purposes other than retransmission.

A UE using a reserved resource for transmission may request feedback with respect to the transmission from other UE(s) or base station(s). Based on the feedback from other UE(s) or base station(s), the UE may elect not to use a reserved resource. For example, a transmitting UE may use the first resource 508 for a data transmission, and may request a receiving UE or a base station receiving the data transmission to provide feedback to the transmitting UE. If the transmitting UE receives feedback from the receiving UE or the base station confirming receipt of the data transmission, the transmitting UE may elect not to use the reserved future resources 510, 512, which may have been originally reserved for retransmissions of the data transmission.

The sidelink resource reservation may be periodic or aperiodic. For example, a UE may periodically reserve resources, such as by indicating a reservation period in an SCI or in one part of the SCI (e.g., a first state control (SCI-1)). Thus, when the periodic resource reservation is enabled, the reservations indicated by the SCI may be repeated with the signaled period. In some examples, if the resource reservation is periodic, the reservation period may be configured to values between 0 milliseconds (ms) and 1000 ms by signaling in the SCI, and the periodic resource reservation may additionally or alternatively be disabled by a (pre-)configuration. In some examples, each reservation of resources may have a priority level indicated in the SCI (or denoted as "resource reservation" herein). In some such example, a higher priority reservation may pre-empt a lower priority reservation.

In sidelink communication, a resource reservation may be indicated by a transmitting UE in multiple SCI parts. The SCI may indicate resources that the UE intends to use, for example, for a sidelink transmission. The UE may transmit a first part of the reservation in a physical sidelink control channel (PSCCH) region, and may transmit a second part of the reservation in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, multiple resources may be indicated (or reserved) through a combination of the first SCI part included in the PSCCH region (e.g., the SCI-1) and the second SCI part included in the PSSCH region (e.g., the SCI-2). For example, the first SCI part in the PSCCH may reserve resource(s) for a UE in a PSSCH, and the first SCI part may also indicate to a receiving UE that there is a second SCI part or more (e.g., two-stage control SCI) in the PSSCH. The second SCI part may reserve other resources, provide signaling, and/or provide information to the receiving UE that may be unrelated to the resources reserved in the first SCI part.

Figure 6:
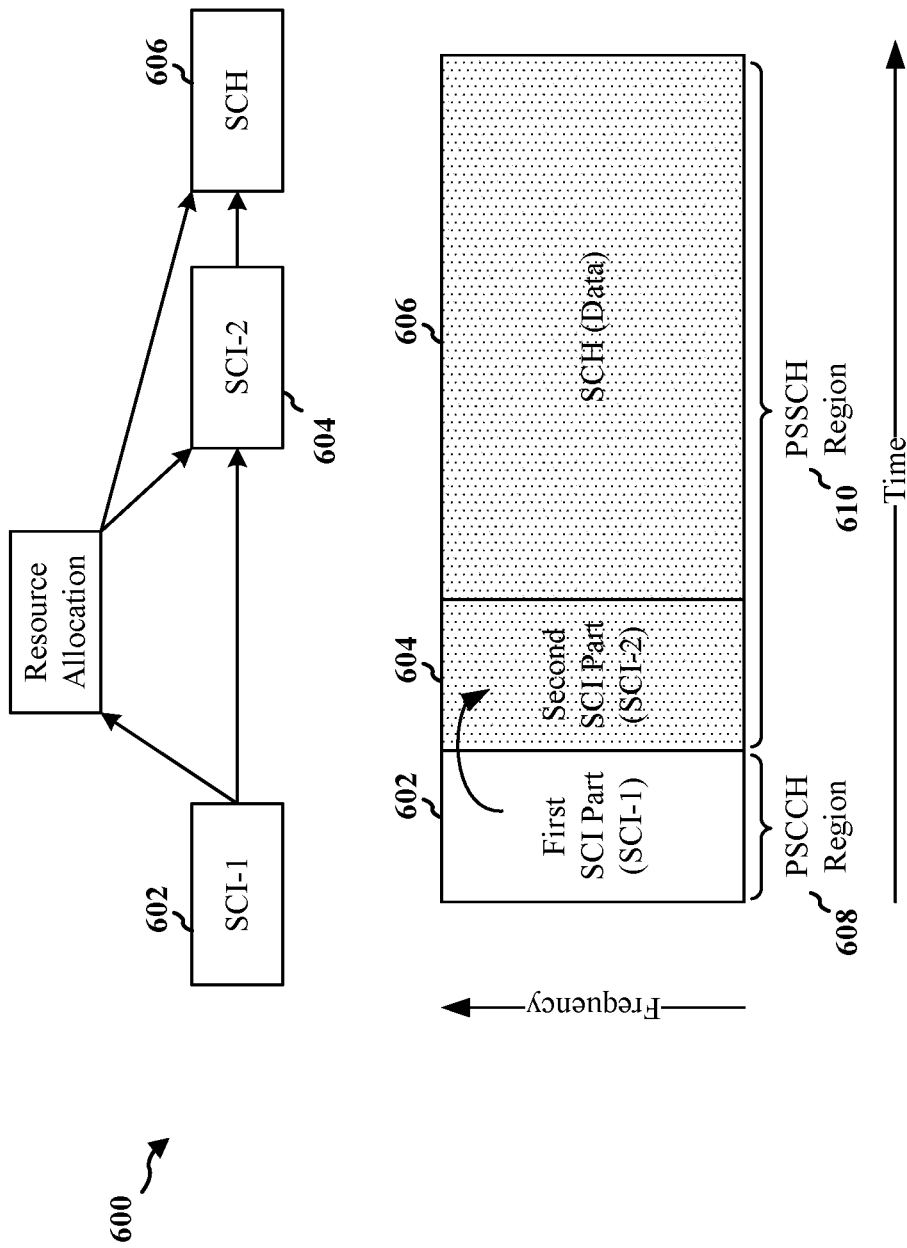
FIG. 6 is a diagram illustrating an example of two-stage physical sidelink control channel (PSCCH), in accordance with one or more of aspects of the present disclosure.

FIG. 6 is a diagram 600 illustrating an example of a two-stage SCI. To reduce control overhead and to improve the processing timeline, SCI used for sidelink grant(s) may be split into two or more parts. In the illustrated example, a first SCI part 602 (e.g., SCI-1) may be transmitted within a control region (e.g., a PSCCH region 608) and a second SCI part 604 (e.g., SCI-2) may be transmitted within a sidelink traffic region (e.g., a PSSCH region 610). The PSCCH region 608 and the PSSCH region 610 may together form one slot. The first SCI part 602 may include initial control information regarding a sidelink transmission, such as a resource assignment (RA) in SCH 606 or other resource reservation information in future slots, rank and modulation order of the sidelink assignment, a bandwidth for the PSSCH region 610, and/or the like. The first SCI part 602 is intended for all UEs to decode, particularly for Mode 2 UEs to avoid resource collisions. In addition, the first SCI part 602 may include control information about the second SCI part 604. In some examples, the control information may indicate the number of resource elements (or size) and code rate of the second SCI part 604. The control information may further indicate the location (e.g., starting resource element) and code rate of the second SCI part 604. In one aspect, the first SCI part 602 (e.g., SCI-1) format may include one or more of the following information: a priority (QoS value), frequency domain resource allocation (FDRA), time domain resource allocation (TDRA), a PSSCH resource assignment (e.g., frequency/time resource for PSSCH), a resource reservation period (e.g., if enabled), a PSSCH DMRS pattern (e.g., if more than one pattern is configured), a second SCI format (e.g. information on the size of the second SCI part), a 2-bit beta offset for second stage control resource allocation, a number of PSSCH DMRS port(s) (e.g., 1 or 2), a 5-bit MCS and/or reserved bits. In one aspect, the second SCI part 604 (e.g., SCI-2) format may include one or more of the following information: hybrid automatic repeat request (HARQ), redundancy version (RV) identifiers, new data indicator (NDI), etc. The second SCI part 604 may include the remaining control information regarding the sidelink assignment. For example, the remaining control information may include non-time critical control information or other resource allocation(s) for data transmission in SCH 606, such as the source and destination ID for the data transmission.

In some implementations, sidelink communications may use a resource pool that includes one or more subchannels (e.g., subchannels SC 1 to SC 4). Accordingly, to receive a sidelink packet, a receiving UE performs blind decoding in all subchannels of the resource pool. A quantity of subchannels in a resource pool may be relatively small (e.g., 1-27 subchannels, as described above), so that blind decoding all subchannels is feasible for a UE. In C-V2X, for example, the UEs are intended to decode all transmissions using blind decoding of all subchannels. In some examples, the subchannel size in V2X is relatively large (e.g., minimum 10 RBs).

In some implementations, a PSCCH in the PSCCH region 608 and a PSSCH in the PSSCH region 610 may be transmitted in the same slot. The PSSCH region 610 may occupy contiguous subchannels up to the total quantity of subchannels in the resource pool (e.g., the PSSCH may occupy $N_{subchannel}^{SL}$). The PSCCH region 608 may occupy only one subchannel (e.g., a subchannel of the resource pool associated with the lowest subchannel index, such as SC1 of FIG. 5).

A UE may locate the PSSCH carrying the second SCI part 604 after decoding first SCI part 602 in the PSCCH region 608. The packet for the second SCI part 604 may indicate a source identifier and a destination identifier to indicate a UE that transmitted the packet and a UE for which the packet is intended.

Figure 7:
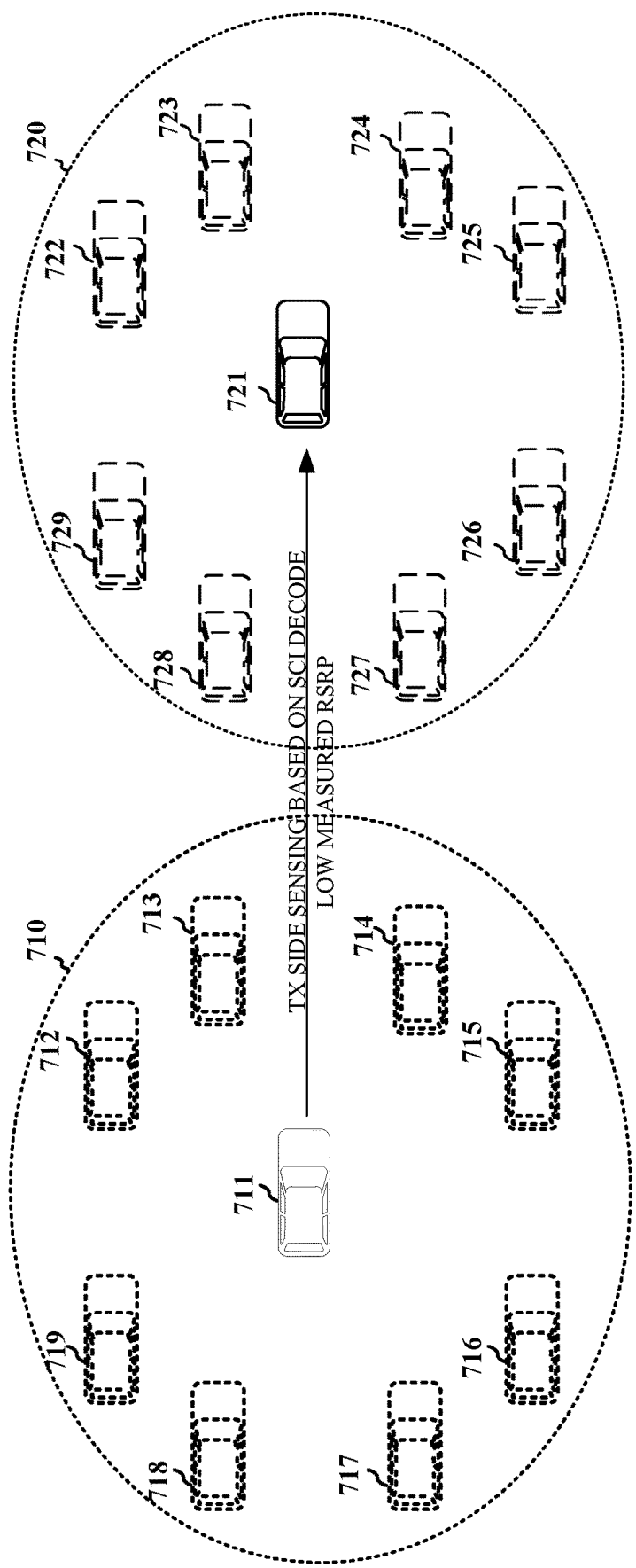
FIGS. 7-16 are diagrams illustrating different examples of sensing in unicast and groupcast sidelink communication, in accordance with one or more of aspects of the present disclosure.

FIG. 7 illustrates a first area 710 of UEs in a groupcast communication configuration and a second area 720 of UEs in a groupcast communication configuration. In some aspects, the first area 710 includes a transmitter UE 711 and receiver UEs 712-719. In some aspects, the second area 720 includes a transmitter UE 721 and receiver UEs 722-729. As illustrated in FIG. 7, the first area 710 and the second area 720 are non-overlapping with each other.

For sidelink networks with groupcast (or broadcast) transmission configurations, a transmitter UE may sense a sidelink channel by using transmitter-side sensing information of any nearby sidelink transmitters including receiver-side sensing information of intended sidelink receivers. Since there may be multiple sidelink receivers around a sidelink transmitter in the groupcast transmission configuration, the transmitter-side sensing may assume a worst-case scenario where at least one of the intended sidelink receivers is located between two sidelink transmitters. On the other hand, unicast transmission configurations may only benefit from the use of receiver-side sensing (e.g., ignoring transmitter-side sensing) for the sidelink channel sensing. Reliance only on receiver-side sensing information may resolve resource waste issues in some environments, such as unicast transmission configurations. However, the sole reliance on receiver-side sensing information by unicast transmitters can lead to under protection issues in mixed cast type sidelink environments, where unicast, groupcast and/or broadcast transmitters coexist in the same resource pool. For example, a groupcast transmission within sidelink networks may receive insufficient protection, where a first sidelink transmitter in a unicast configuration may obtain receiver-side sensing information of its receiver and deemphasize transmitter-side sensing by ignoring the transmitter-side sensing of a second sidelink transmitter in a groupcast configuration, which may lead to an occurrence of actual interference between the sidelink transmitters. This de-emphasis in transmitter-side sensing is undesirable as it results in lesser protection to transmitters in mixed cast type networks.

The subject technology provides for facilitating improvement in sensing for unicast sidelink communication by allowing a UE to transmit its sidelink signaling to its intended sidelink receivers at a same time as another sidelink transmitter without deemphasizing in transmitter-side sensing information. In some aspects, the UE can ignore a resource reservation included in an incoming first-stage SCI (e.g., SCI-1) if the UE is following its sidelink receiver (or other UE) recommendation and the SCI-1 indicates that the other sidelink transmitter is following its receiver (or other UE) recommendation. In other aspects, the UE can ignore resource reservation information included in the incoming SCI-1 if the sensed transmitter UE is following its receiver (or other UE) recommendation and the SCI-1 transmitter cast type is unicast. In some aspects, the UE may decode both SCI-1 and SCI-2 to determine the transmitter cast type. In still other aspects, the UE can ignore the resource reservation included in incoming SCI-1 based primarily on the indication that the other sidelink transmitter is following its receiver (or other UE) recommendation.

In operation, the transmitter UE 711 transmits a groupcast signal to its receiver UEs 712-719 within the first area 710. The transmitter UE 721 determines whether it can transmit its groupcast signal to its receiver UEs 722-729 at a same time as the transmitter UE 711 by performing transmission side sensing of the sidelink signal originating from the transmitter UE 711. The transmitter UE 721 may measure the signal strength of the transmitted groupcast signal. For example, the transmitter UE 721 may obtain RSRP measurements of the groupcast signal. The transmitter UE 721 may decode the SCI within the transmitted groupcast signal and determine resource reservation information of the transmitter UE 711. The transmitter UE 721 may compare the RSRP measurements to a reference threshold and determine whether the RSRP measurements exceed the reference threshold. As illustrated in FIG. 7, the transmitter UE 721 may determine that the RSRP measurements are low enough that they do not exceed the reference threshold. In this regard, the transmitter UE 721 may decide to ignore the resource reservation indicated by the transmitter UE 711. The transmitter UE 721 may transmit its groupcast signal to its receiver 722-729 at the same time as the transmitter UE 711 in an interference-free environment based on its determination that the groupcast signal originating from the transmitter UE 711 is likely not to interference with its groupcast signaling to its local receivers.

Figure 8:
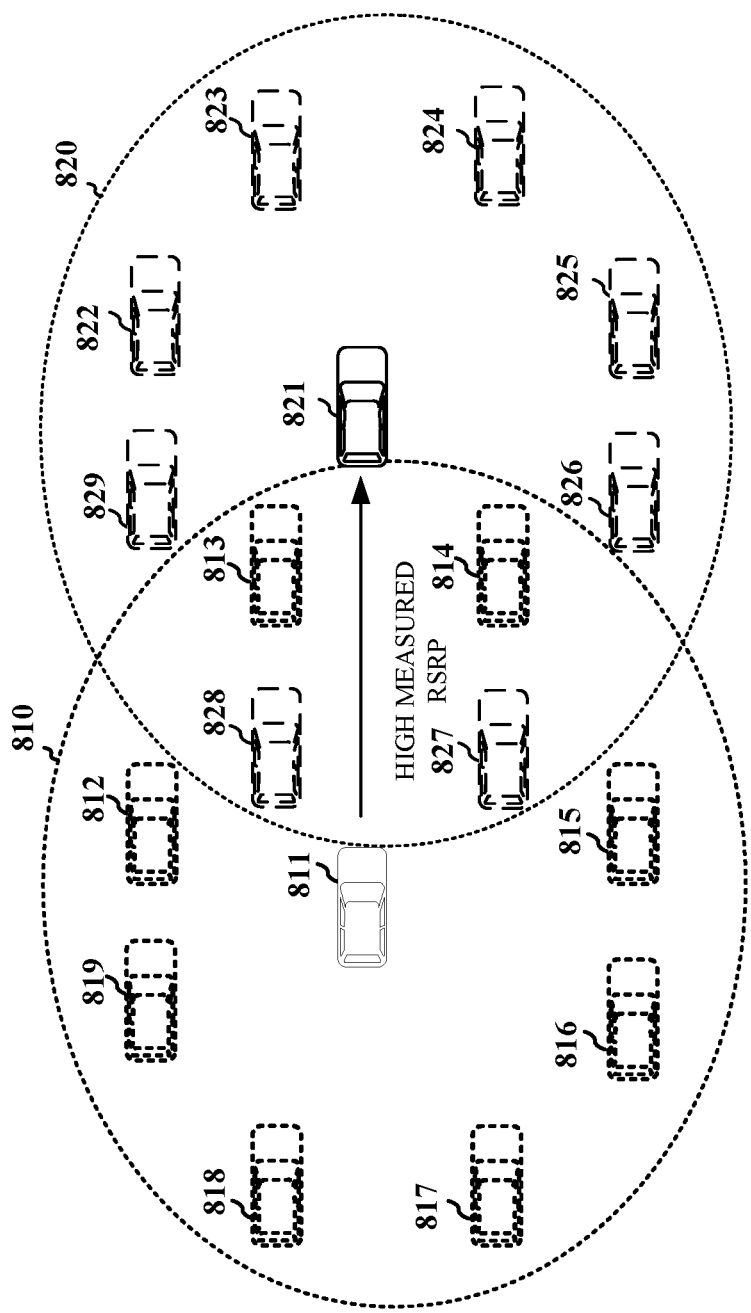

FIG. 8 illustrates a first area 810 of UEs in a groupcast communication configuration and a second area 820 of UEs in a groupcast communication configuration. In some aspects, the first area 810 includes a transmitter UE 811 and receiver UEs 812-819. In some aspects, the second area 820 includes a transmitter UE 821 and receiver UEs 822-829. As illustrated in FIG. 8, the first area 710 and the second area 720 are partially overlapping with each other such that the transmitter UE 811 and the transmitter 821 are separated by a distance that is smaller than that illustrated in FIG. 7.

In operation, the transmitter UE 811 transmits a groupcast signal to its receiver UEs 812-819 within the first area 810. The transmitter UE 821 determines whether it can transmit its groupcast signal to its receiver UEs 822-829 at a same time as the transmitter UE 811 by performing transmission side sensing of the sidelink signaling originating from the transmitter UE 811. The transmitter UE 821 may measure the signal strength of the transmitted groupcast signal. For example, the transmitter UE 821 may obtain RSRP measurements of the groupcast signal. The transmitter UE 821 may decode the SCI within the transmitted groupcast signal and determine resource reservation information of the transmitter UE 811. The resource reservation may indicate that certain resources are reserved for any one of receiver UEs 712-719, of which resources may be assigned to receiver UEs 813 and 814 that are located within the overlapping region. In some aspects, the transmitter UE 711 may indicate within the SCI whether the transmitter UE 821 is following a resource recommendation of any one of its receiver UEs 712-719. In an example, the indication may include a binary value that logically indicates the resource recommendation following status of the transmitter UE 711. The resource recommendation to the transmitter UE 711 may indicate that receiver UEs 813 and 814 are located near other sidelink UEs, such as the transmitter UE 821 and receiver UEs 826-829, that may cause interference in their attempts to receive the groupcast signal from the transmitter UE 711. As illustrated, the transmitter UE 711 may not be following its receiver resource recommendation, and therefore, transmits its groupcast signal within the first area 810. The transmitter UE 821 may compare the RSRP measurements to the reference threshold and determine whether the RSRP measurements exceed the reference threshold. As illustrated in FIG. 8, the transmitter UE 821 may determine that the RSRP measurements are high that they exceed the reference threshold. In this regard, the transmitter UE 821 may acknowledge the resource reservation indicated by the transmitter UE 811. Given that the RSRP measurements exceed the threshold and the transmitter UE 811 is not following its receiver resource recommendation, the transmitter UE 821 may refrain from transmitting its groupcast signal to its receiver 822-829 at the same time as the transmitter UE 811 to avoid any interference of its groupcast signaling to its local receivers by the groupcast signal originating from the transmitter UE 811.

Figure 9:
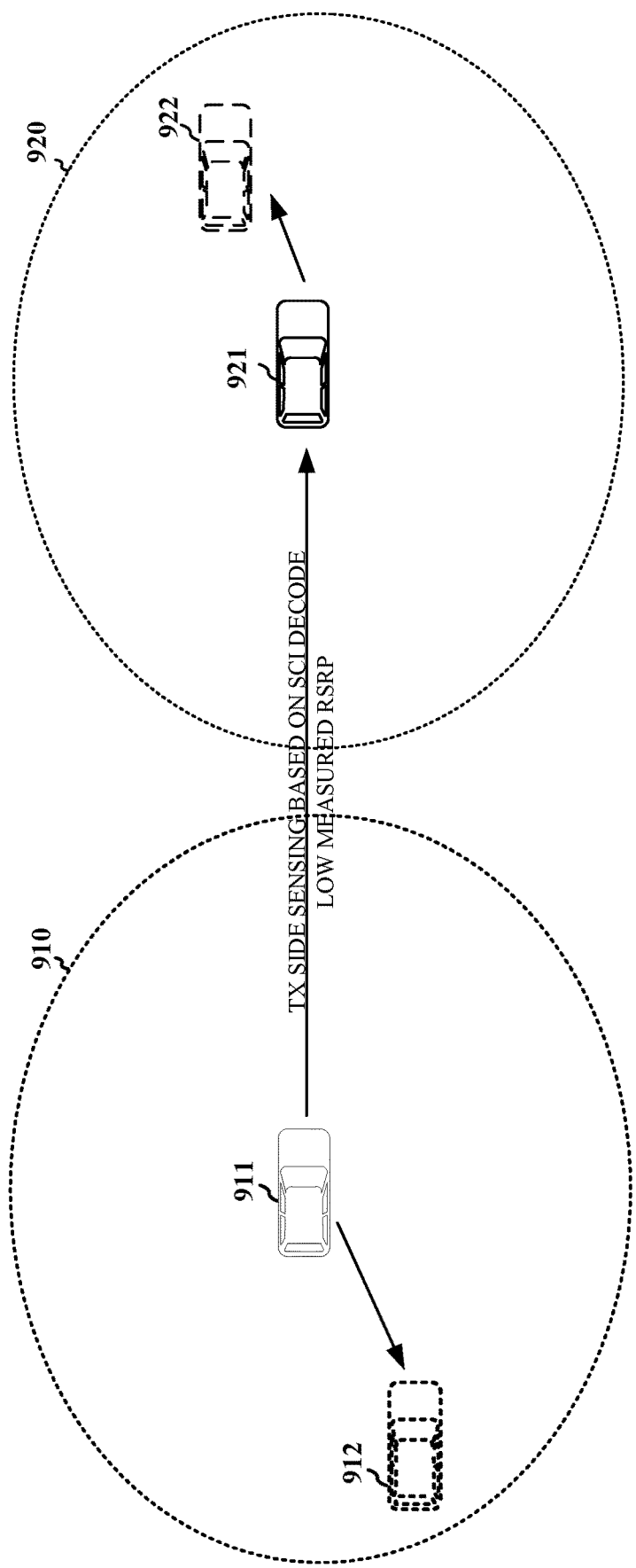

FIG. 9 illustrates a first area 910 of UEs in a unicast communication configuration and a second area 920 of UEs in a unicast communication configuration. In some aspects, the first area 910 includes a transmitter UE 911 and a receiver UE 912. In some aspects, the second area 920 includes a transmitter UE 921 and a receiver UE 922. As illustrated in FIG. 9, the first area 910 and the second area 920 are non-overlapping with each other.

In operation, the transmitter UE 911 transmits a unicast signal to its receiver UE 912 within the first area 910. The transmitter UE 921 determines whether it can transmit its unicast signal to its receiver UE 922 at a same time as the transmitter UE 911 by performing transmission side sensing of the sidelink signaling originating from the transmitter UE 911. The transmitter UE 921 may measure the signal strength of the transmitted unicast signal. For example, the transmitter UE 921 may obtain RSRP measurements of the unicast signal. The transmitter UE 921 may decode the SCI within the transmitted unicast signal and determine resource reservation information of the transmitter UE 911. In some aspects, the decoded SCI may include an indication that the transmitter UE 921 is following a resource recommendation of its receiver UE 912. In some aspects, the transmitter UE 921 may decode the first-stage SCI and second-stage SCI to determine a transmitter cast type of the transmitter UE 911. In an example, the transmitter UE 921 may determine that the transmitter cast type of the transmitter UE 911 is a unicast transmitter as illustrated in the unicast communication configuration within the first area 910. The transmitter UE 921 may compare the RSRP measurements to the reference threshold and determine whether the RSRP measurements exceed the reference threshold. As illustrated in FIG. 9, the transmitter UE 921 may determine that the RSRP measurements are low enough that they do not exceed the reference threshold. In this regard, the transmitter UE 921 may decide to ignore the resource reservation indicated by the transmitter UE 911 based on the presence of the indication that the transmitter UE 911 is following its receiver UE resource recommendation. The transmitter UE 921 may transmit its unicast signal to its receiver 922 at the same time as the transmitter UE 911 in an interference-free environment based on its determination that the unicast signal originating from the transmitter UE 911 is likely not to interference with its unicast signaling to its local receiver.

Figure 10:
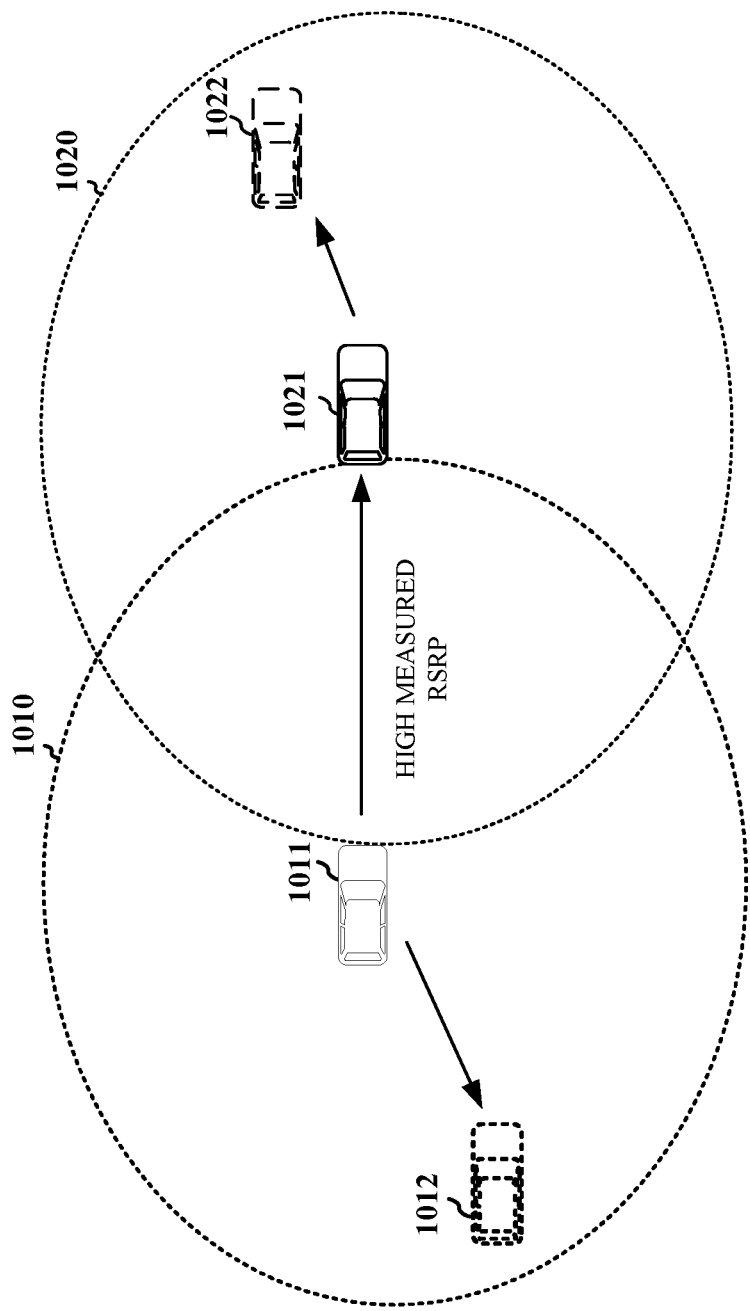

FIG. 10 illustrates a first area 1010 of UEs in a unicast communication configuration and a second area 1020 of UEs in a unicast communication configuration. In some aspects, the first area 1010 includes a transmitter UE 1011 and a receiver UE 1012. In some aspects, the second area 1020 includes a transmitter UE 1021 and a receiver UE 1022. As illustrated in FIG. 10, the first area 1010 and the second area 1020 are partially overlapping with each other.

In operation, the transmitter UE 1011 transmits a unicast signal to its receiver UE 1012 within the first area 1010. The transmitter UE 1021 determines whether it can transmit its unicast signal to its receiver UE 1022 at a same time as the transmitter UE 1011 by performing transmission side sensing of the sidelink signaling originating from the transmitter UE 1011. The transmitter UE 1021 may measure the signal strength of the transmitted unicast signal. For example, the transmitter UE 1021 may obtain RSRP measurements of the unicast signal. The transmitter UE 1021 may decode the SCI within the transmitted unicast signal and determine resource reservation information of the transmitter UE 1011. In some aspects, the decoded SCI may include an indication that the transmitter UE 1021 is following a resource recommendation of its receiver UE 1012. In some aspects, the transmitter UE 1021 may decode the first-stage SCI and second-stage SCI to determine a transmitter cast type of the transmitter UE 1011. In an example, the transmitter UE 1021 may determine that the transmitter cast type of the transmitter UE 1011 is a unicast transmitter as illustrated in the unicast communication configuration within the first area 1010. The transmitter UE 1021 may compare the RSRP measurements to the reference threshold and determine whether the RSRP measurements exceed the reference threshold. As illustrated in FIG. 10, the transmitter UE 1021 may determine that the RSRP measurements are high in that they exceed the reference threshold. Although the RSRP measurements exceed the reference threshold, the transmitter UE 1021 may decide to ignore the resource reservation indicated by the transmitter UE 1011 based on the presence of the indication that the transmitter UE 1011 is following its receiver UE resource recommendation and/or the determination that the transmitter cast type of the transmitter UE 1011 is unicast. The transmitter UE 1021 may transmit its unicast signal to its receiver 1022 at the same time as the transmitter UE 1011 in an interference-free environment based on its determination that the unicast signal originating from the transmitter UE 1011 is likely not to interference with its unicast signaling to its local receiver.

Figure 11:
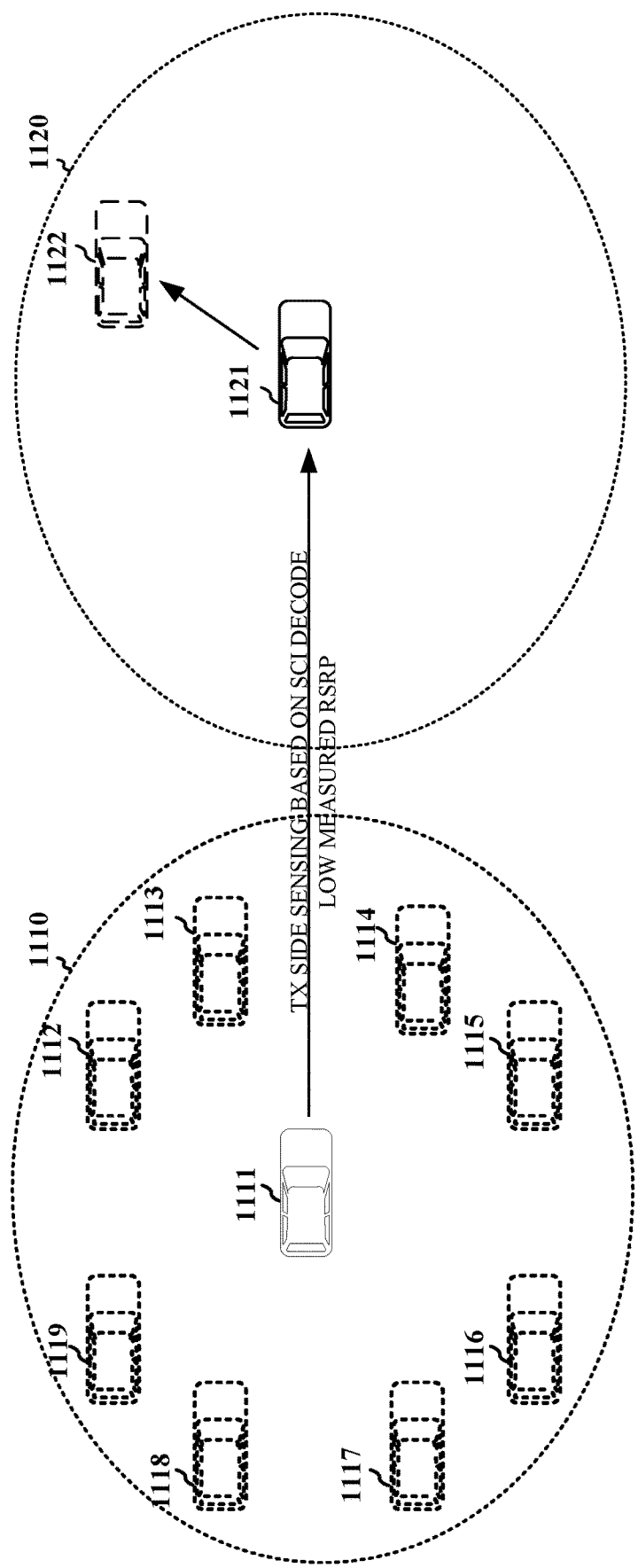

FIG. 11 illustrates a first area 1110 of UEs in a groupcast communication configuration and a second area 1120 of UEs in a unicast communication configuration. In some aspects, the first area 1110 includes a transmitter UE 1111 and receiver UEs 1112-1119. In some aspects, the second area 1120 includes a transmitter UE 1121 and a receiver UE 1122. As illustrated in FIG. 11, the first area 1110 and the second area 1120 are non-overlapping with each other.

As discussed above, issues in transmission protection may arise in mixed cast type sidelink environments. For example, a groupcast transmission within sidelink networks may receive insufficient protection, where a first sidelink transmitter in a unicast configuration may obtain receiver-side sensing information of its receiver and deemphasize transmitter-side sensing by ignoring the transmitter-side sensing of a second sidelink transmitter in a groupcast configuration, which may lead to an occurrence of actual interference between the sidelink transmitters. This de-emphasis in transmitter-side sensing is undesirable as it results in lesser protection to transmitters in mixed cast type networks.

In this regard, the subject technology provides for facilitating improvement in sensing for unicast sidelink communication by allowing a UE to transmit its sidelink signaling to its intended sidelink receivers at a same time as another sidelink transmitter without deemphasizing in transmitter-side sensing information. In some aspects, the UE can ignore a resource reservation included in an incoming first-stage SCI (e.g., SCI-1) if the UE is following its sidelink receiver (or other UE) recommendation and the SCI-1 indicates that the other sidelink transmitter is following its receiver (or other UE) recommendation. In other aspects, the UE can ignore resource reservation information included in the incoming SCI-1 if the sensed transmitter UE is following its receiver (or other UE) recommendation and the SCI-1 transmitter cast type is unicast. In some aspects, the UE may decode both SCI-1 and SCI-2 to determine the transmitter cast type. In still other aspects, the UE can ignore the resource reservation included in incoming SCI-1 based primarily on the indication that the other sidelink transmitter is following its receiver (or other UE) recommendation.

In operation, the transmitter UE 1111 transmits a groupcast signal to its receiver UEs 1112-1119 within the first area 1110. The transmitter UE 1121 determines whether it can transmit its unicast signal to its receiver UE 1122 at a same time as the transmitter UE 1111 by performing transmission side sensing of the sidelink signaling originating from the transmitter UE 1111. The transmitter UE 1121 may measure the signal strength of the transmitted groupcast signal. For example, the transmitter UE 1121 may obtain RSRP measurements of the groupcast signal. The transmitter UE 1121 may decode the SCI within the transmitted groupcast signal and determine resource reservation information of the transmitter UE 1111. In some aspects, the decoded SCI may include an indication that the transmitter UE 1121 is following a resource recommendation of any one of its receiver UEs 1112-1119. In some aspects, the transmitter UE 1121 may decode the first-stage SCI and second-stage SCI to determine a transmitter cast type of the transmitter UE 1111. In an example, the transmitter UE 1121 may determine that the transmitter cast type of the transmitter UE 1111 is a groupcast transmitter as illustrated in the groupcast communication configuration within the first area 1110. The transmitter UE 1121 may compare the RSRP measurements to the reference threshold and determine whether the RSRP measurements exceed the reference threshold. As illustrated in FIG. 11, the transmitter UE 1121 may determine that the RSRP measurements are low enough that they do not exceed the reference threshold. In this regard, the transmitter UE 1121 may decide to ignore the resource reservation indicated by the transmitter UE 1111 based on the presence of the indication that the transmitter UE 1111 is following its receiver UE resource recommendation and that the threshold is not exceeded. The transmitter UE 1121 may transmit its unicast signal to its receiver 1122 at the same time as the transmitter UE 1111 in an interference-free environment based on its determination that the groupcast signal originating from the transmitter UE 1111 is likely not to interference with its unicast signaling to its local receiver.

FIG. 12 illustrates a first area 1210 of UEs in a groupcast communication configuration and a second area 1220 of UEs in a unicast communication configuration. In some aspects, the first area 1210 includes a transmitter UE 1211 and receiver UEs 1212-1219. In some aspects, the second area 1220 includes a transmitter UE 1221 and a receiver UE 1222. As illustrated in FIG. 12, the first area 1210 and the second area 1220 are partially overlapping with each other.

In operation, the transmitter UE 1211 transmits a groupcast signal to its receiver UEs 1212-1219 within the first area 1210. The transmitter UE 1221 determines whether it can transmit its unicast signal to its receiver UE 1222 at a same time as the transmitter UE 1211 by performing transmission side sensing of the sidelink signaling originating from the transmitter UE 1211. The transmitter UE 1221 may measure the signal strength of the transmitted groupcast signal. For example, the transmitter UE 1221 may obtain RSRP measurements of the groupcast signal. The transmitter UE 1221 may decode the SCI within the transmitted groupcast signal and determine resource reservation information of the transmitter UE 1211. In some aspects, the decoded SCI may not include an indication that the transmitter UE 1221 is following a resource recommendation of its receiver UE 1212. In other aspects, the decoded SCI may include an indication that the transmitter UE 1221 is not following the resource recommendation of any one of its receiver UEs 1212-1219. In some aspects, the transmitter UE 1221 may receive a resource recommendation from its receiver UE 1222 that indicates that reserved resources assigned to the receiver UE 1222 are not likely to be interfered by any sidelink including the groupcast signal originating from the transmitter UE 1211. In some aspects, the transmitter UE 1221 may decode the first-stage SCI and second-stage SCI to determine a transmitter cast type of the transmitter UE 1211. In an example, the transmitter UE 1221 may determine that the transmitter cast type of the transmitter UE 1211 is a groupcast transmitter as illustrated in the unicast communication configuration within the first area 1210. The transmitter UE 1221 may compare the RSRP measurements to the reference threshold and determine whether the RSRP measurements exceed the reference threshold. As illustrated in FIG. 12, the transmitter UE 1221 may determine that the RSRP measurements are high that they exceed the reference threshold. Although the RSRP measurements exceed the reference threshold, the transmitter UE 1221 may decide to ignore the resource reservation indicated by the transmitter UE 1211 based on reliance of the resource recommendation from its receiver UE 1222. The transmitter UE 1221 may transmit its unicast signal to its receiver 1222 at the same time as the transmitter UE 1211 in an interference-free environment based on its determination that the groupcast signal originating from the transmitter UE 1211 is likely not to interference with its unicast signaling to its local receiver.

Figure 13:
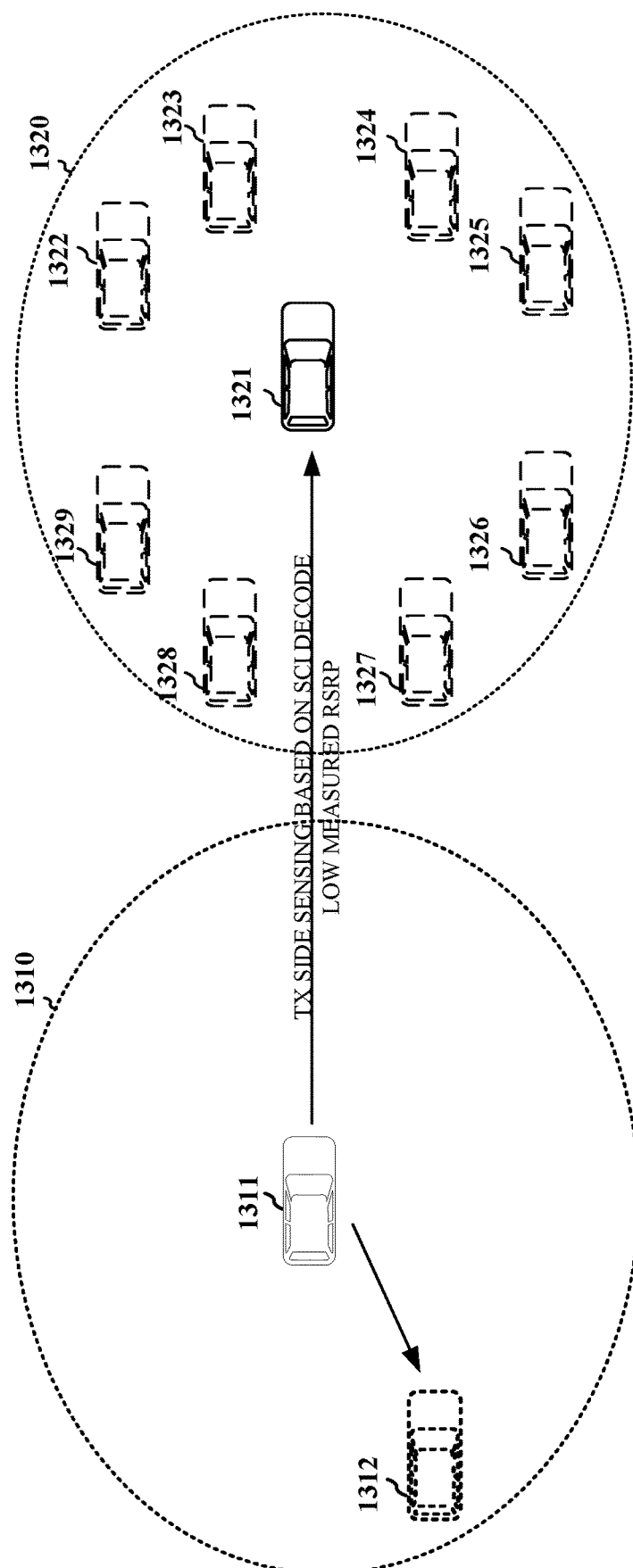

FIG. 13 illustrates a first area 1310 of UEs in a unicast communication configuration and a second area 1320 of UEs in a groupcast communication configuration. In some aspects, the first area 1310 includes a transmitter UE 1311 and a receiver UE 1312. In some aspects, the second area 1320 includes a transmitter UE 1321 and receiver UEs 1322-1329. As illustrated in FIG. 13, the first area 1310 and the second area 1320 are non-overlapping with each other.

In operation, the transmitter UE 1311 transmits a unicast signal to its receiver UE 1312 within the first area 1310. The transmitter UE 1321 determines whether it can transmit its groupcast signal to its receivers UEs 1322-1329 at a same time as the transmitter UE 1311 by performing transmission side sensing of the sidelink signaling originating from the transmitter UE 1311. The transmitter UE 1321 may measure the signal strength of the transmitted unicast signal. For example, the transmitter UE 1321 may obtain RSRP measurements of the unicast signal. The transmitter UE 1321 may decode the SCI within the transmitted unicast signal and determine resource reservation information of the transmitter UE 1311. In some aspects, the decoded SCI may include an indication that the transmitter UE 1321 is following a resource recommendation of its receiver UE 1312. In some aspects, the transmitter UE 1321 may decode the first-stage SCI and second-stage SCI to determine a transmitter cast type of the transmitter UE 1311. In an example, the transmitter UE 1321 may determine that the transmitter cast type of the transmitter UE 1311 is a unicast transmitter as illustrated in the unicast communication configuration within the first area 1310. The transmitter UE 1321 may compare the RSRP measurements to the reference threshold and determine whether the RSRP measurements exceed the reference threshold. As illustrated in FIG. 13, the transmitter UE 1321 may determine that the RSRP measurements are low enough that they do not exceed the reference threshold. In this regard, the transmitter UE 1321 may decide to ignore the resource reservation indicated by the transmitter UE 1311 based on the threshold not being exceeded and/or the presence of the indication that the transmitter UE 1311 is following its receiver UE resource recommendation. The transmitter UE 1321 may transmit its groupcast signal to its receivers 1322-1329 at the same time as the transmitter UE 1311 in an interference-free environment based on its determination that the unicast signal originating from the transmitter UE 1311 is likely not to interference with its groupcast signaling to its local receivers.

Figure 14:
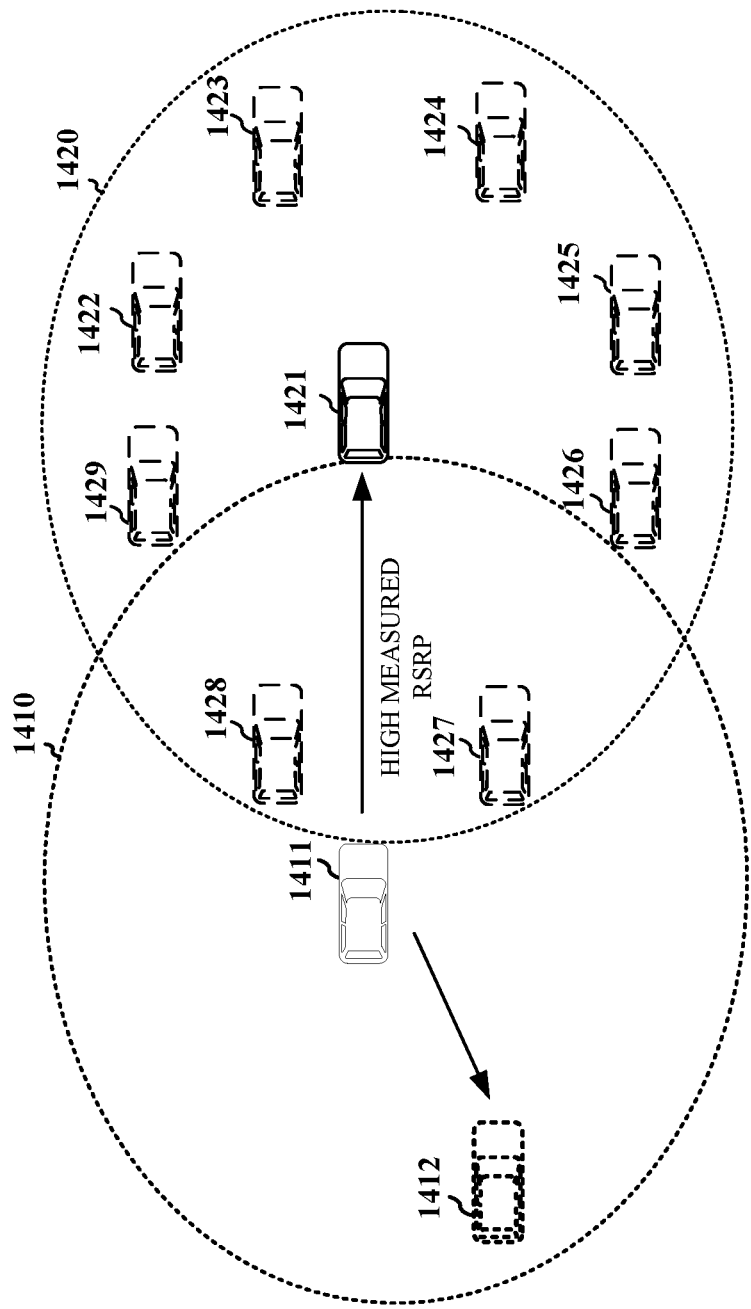

FIG. 14 illustrates a first area 1410 of UEs in a unicast communication configuration and a second area 1420 of UEs in a groupcast communication configuration. In some aspects, the first area 1410 includes a transmitter UE 1411 and a receiver UE 1412. In some aspects, the second area 1420 includes a transmitter UE 1421 and receiver UEs 1422-1429. As illustrated in FIG. 14, the first area 1410 and the second area 1420 are partially overlapping with each other.

In operation, the transmitter UE 1411 transmits a unicast signal to its receiver UE 1412 within the first area 1410. In this regard, the transmitter UE 1411 may beam form a transmission signal in a directional manner toward the receiver UE 1412. The transmitter UE 1421 determines whether it can transmit its groupcast signal to its receivers UEs 1422-1429 at a same time as the transmitter UE 1411 by performing transmission side sensing of the sidelink signaling originating from the transmitter UE 1411. The transmitter UE 1421 may measure the signal strength of the transmitted unicast signal. For example, the transmitter UE 1421 may obtain RSRP measurements of the unicast signal. The transmitter UE 1421 may decode the SCI within the transmitted unicast signal and determine resource reservation information of the transmitter UE 1411. In some aspects, the decoded first-stage SCI may include an indication that the transmitter UE 1421 is following a resource recommendation of its receiver UE 1412. In some aspects, the transmitter UE 1421 may decode the first-stage SCI and second-stage SCI to determine a transmitter cast type of the transmitter UE 1411. In an example, the transmitter UE 1421 may determine that the transmitter cast type of the transmitter UE 1411 is a unicast transmitter as illustrated in the unicast communication configuration within the first area 1410. The transmitter UE 1421 may compare the RSRP measurements to the reference threshold and determine whether the RSRP measurements exceed the reference threshold. As illustrated in FIG. 14, the transmitter UE 1421 may determine that the RSRP measurements are high that they exceed the reference threshold. Although the RSRP measurements exceed the threshold, the transmitter UE 1421 may decide to ignore the resource reservation indicated by the transmitter UE 1411 based on the presence of the indication that the transmitter UE 1411 is following its receiver UE resource recommendation and/or the transmitter cast type of the transmitter UE 1411 being unicast. The transmitter UE 1421 may transmit its groupcast signal to its receivers 1422-1429 at the same time as the transmitter UE 1411 in an interference-free environment based on its determination that the unicast signal originating from the transmitter UE 1411 is likely not to interference with its groupcast signaling to its local receivers.

Figure 15:
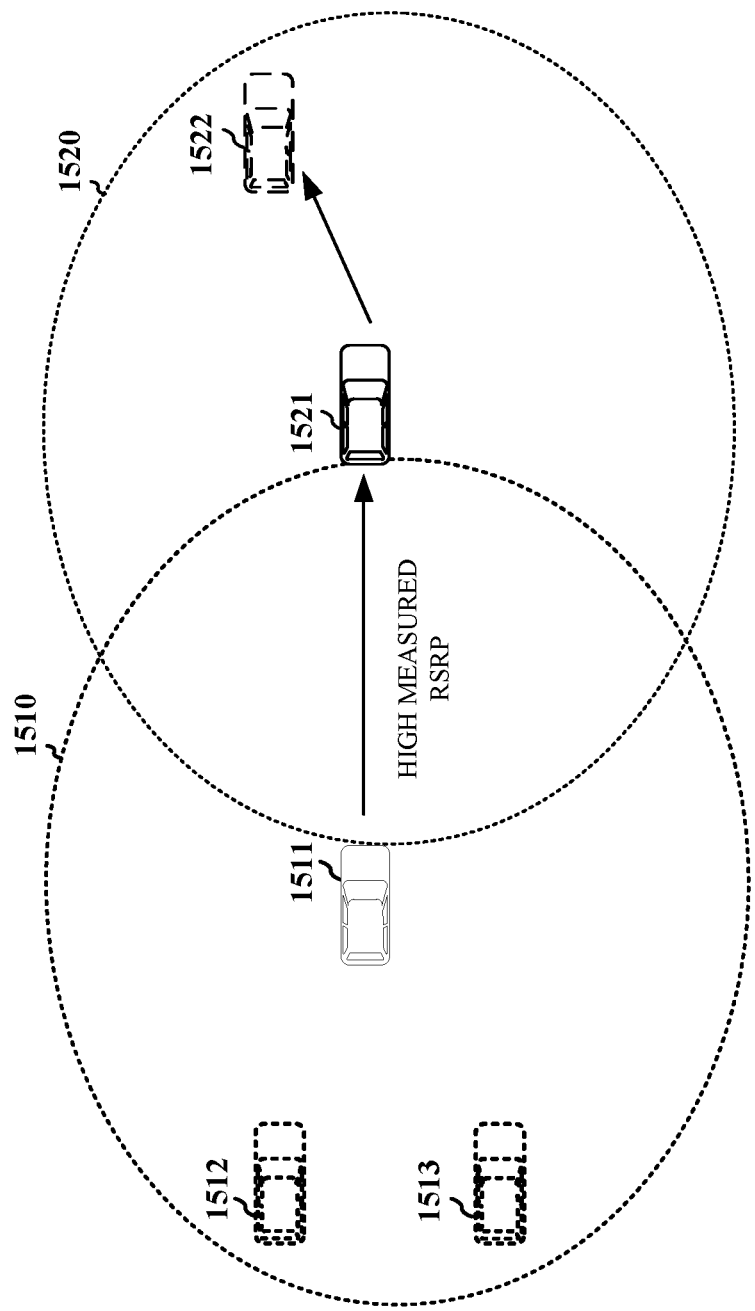

FIG. 15 illustrates a first area 1510 of UEs in a groupcast communication configuration and a second area 1520 of UEs in a unicast communication configuration. In some aspects, the first area 1510 includes a transmitter UE 1511 and receiver UEs 1512-1513. In some aspects, the second area 1520 includes a transmitter UE 1521 and a receiver UE 1522. As illustrated in FIG. 15, the first area 1510 and the second area 1520 are partially overlapping with each other.

In operation, the transmitter UE 1511 transmits a groupcast signal to its receiver UEs 1512-1513 within the first area 1510. The transmitter UE 1521 determines whether it can transmit its unicast signal to its receiver UE 1522 at a same time as the transmitter UE 1511 by performing transmission side sensing of the sidelink signaling originating from the transmitter UE 1511. The transmitter UE 1521 may measure the signal strength of the transmitted groupcast signal. For example, the transmitter UE 1521 may obtain RSRP measurements of the groupcast signal. The transmitter UE 1521 may decode the SCI within the transmitted groupcast signal and determine resource reservation information of the transmitter UE 1511. In some aspects, the decoded SCI includes an indication that the transmitter UE 1511 is following a resource recommendation of any one of its receiver UEs 1512-1513. The resource recommendation may indicate that the resources reserved for the receiver UEs 1512 and 1513 are not likely to be interfered due to the non-presence of any nearby interfering transmitters. In some aspects, the transmitter UE 1521 may receive a resource recommendation from its receiver UE 1522 that indicates that reserved resources assigned to the receiver UE 1522 are not likely to be interfered by any sidelink UEs including the groupcast signal originating from the transmitter UE 1511. In some aspects, the transmitter UE 1521 may decode the first-stage SCI and second-stage SCI to determine a transmitter cast type of the transmitter UE 1511. In an example, the transmitter UE 1521 may determine that the transmitter cast type of the transmitter UE 1511 is a groupcast transmitter as illustrated in the unicast communication configuration within the first area 1510. The transmitter UE 1521 may compare the RSRP measurements to the reference threshold and determine whether the RSRP measurements exceed the reference threshold. As illustrated in FIG. 15, the transmitter UE 1521 may determine that the RSRP measurements are high that they exceed the reference threshold. Although the RSRP measurements exceed the reference threshold, the transmitter UE 1521 may decide to ignore the resource reservation indicated by the transmitter UE 1511 based on reliance of the resource recommendation from its receiver UE 1522 and the presence of the indication within the decoded SCI that the transmitter UE 1511 is following the resource recommendation of its receiver UEs 1512-1513. The transmitter UE 1521 may transmit its unicast signal to its receiver 1522 at the same time as the transmitter UE 1511 in an interference-free environment based on its determination that the groupcast signal originating from the transmitter UE 1511 is likely not to interference with its unicast signaling to its local receiver.

Figure 16:
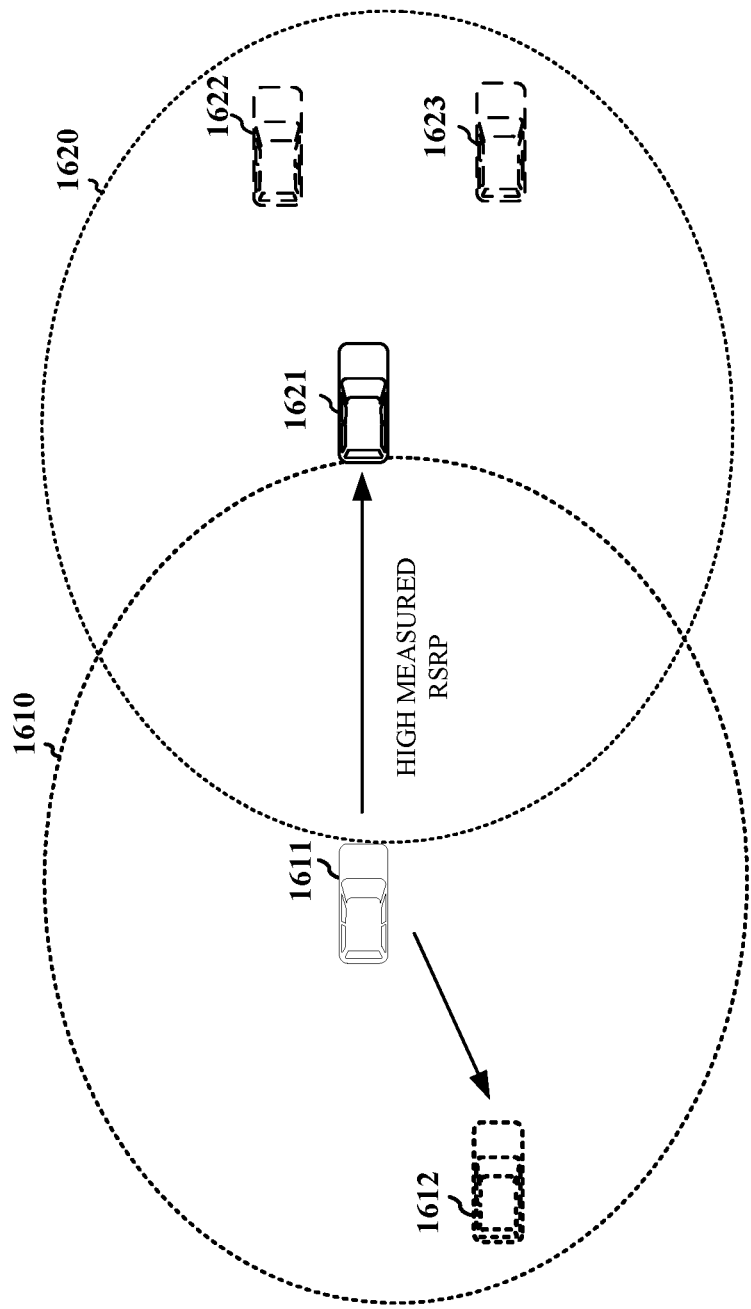

FIG. 16 illustrates a first area 1610 of UEs in a unicast communication configuration and a second area 1620 of UEs in a groupcast communication configuration. In some aspects, the first area 1610 includes a transmitter UE 1611 and a receiver UE 1612. In some aspects, the second area 1620 includes a transmitter UE 1621 and receiver UEs 1622-1623. As illustrated in FIG. 16, the first area 1610 and the second area 1620 are partially overlapping with each other.

In operation, the transmitter UE 1611 transmits a unicast signal to its receiver UE 1612 within the first area 1610. In this regard, the transmitter UE 1611 may beam form a transmission signal in a directional manner toward the receiver UE 1612. The transmitter UE 1621 determines whether it can transmit its groupcast signal to its receivers UEs 1622-1623 at a same time as the transmitter UE 1611 by performing transmission side sensing of the sidelink signaling originating from the transmitter UE 1611. The transmitter UE 1621 may measure the signal strength of the transmitted unicast signal. For example, the transmitter UE 1621 may obtain RSRP measurements of the unicast signal. The transmitter UE 1621 may decode the SCI within the transmitted unicast signal and determine resource reservation information of the transmitter UE 1611. In some aspects, the decoded first-stage SCI may include an indication that the transmitter UE 1621 is following a resource recommendation of its receiver UE 1612. In some aspects, the transmitter UE 1621 may receive a resource recommendation from any one of its receiver UEs 1622-1623 that indicates that reserved resources assigned to the receiver UEs 1622-1623 are not likely to be interfered due to the non-presence of any nearby interfering transmitters including the unicast signal originating from the transmitter UE 1611. In some aspects, the transmitter UE 1621 may decode the first-stage SCI and second-stage SCI to determine a transmitter cast type of the transmitter UE 1611. In an example, the transmitter UE 1621 may determine that the transmitter cast type of the transmitter UE 1611 is a unicast transmitter as illustrated in the unicast communication configuration within the first area 1610. The transmitter UE 1621 may compare the RSRP measurements to the reference threshold and determine whether the RSRP measurements exceed the reference threshold. As illustrated in FIG. 16, the transmitter UE 1621 may determine that the RSRP measurements are high that they exceed the reference threshold. Although the RSRP measurements exceed the threshold, the transmitter UE 1621 may decide to ignore the resource reservation indicated by the transmitter UE 1611 based on the presence of the indication that the transmitter UE 1611 is following its receiver UE resource recommendation and/or the transmitter UE 1621 following the resource recommendation of its receiver UEs 1622-1623 and/or the transmitter cast type of the transmitter UE 1611 being unicast. The transmitter UE 1621 may transmit its groupcast signal to its receivers 1622-1623 at the same time as the transmitter UE 1611 in an interference-free environment based on its determination that the unicast signal originating from the transmitter UE 1611 is likely not to interference with its groupcast signaling to its local receivers.

Figure 17:
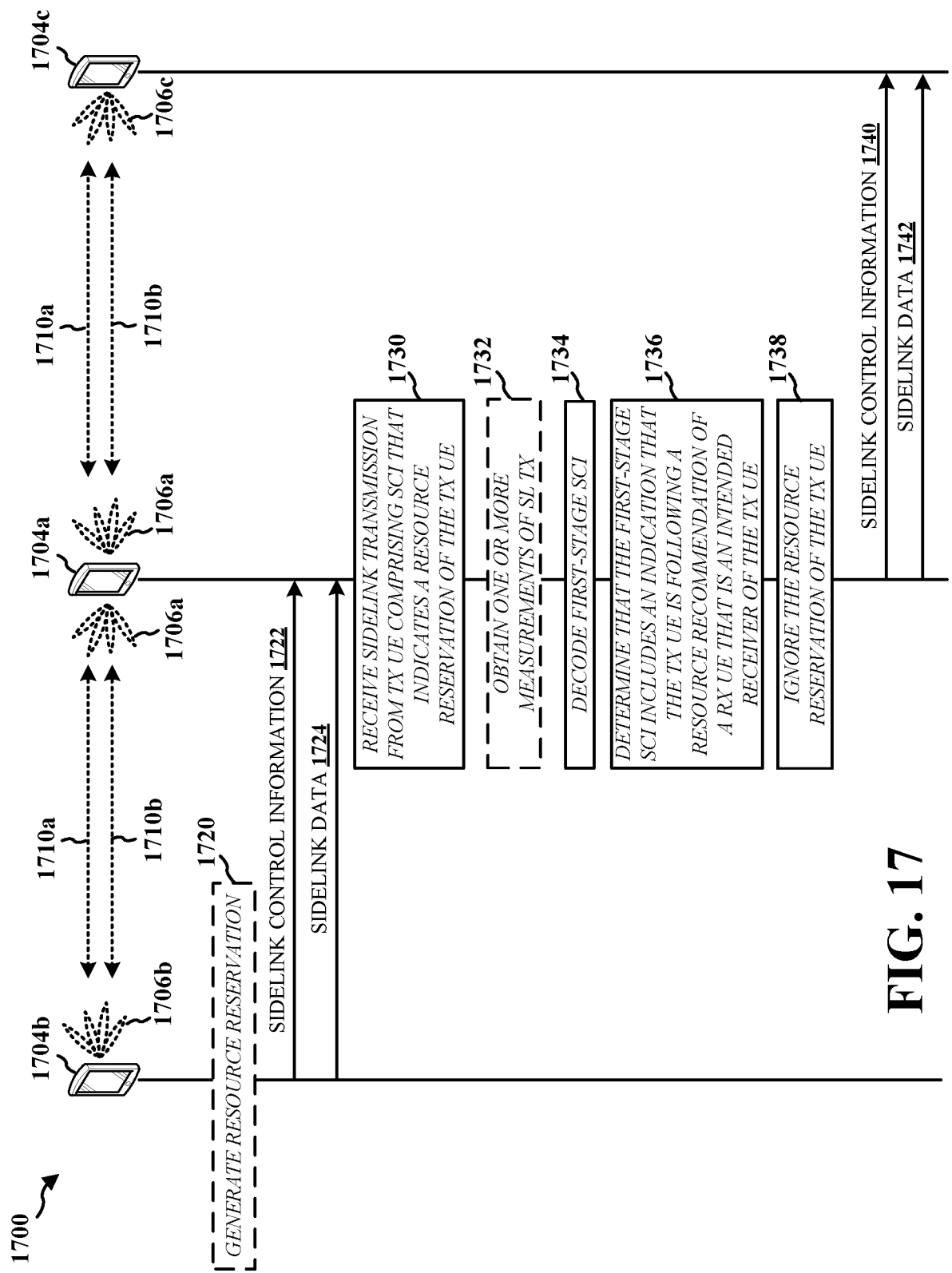
FIG. 17 is an example communication flow for improvement in sensing for unicast sidelink communication, in accordance with one or more of the teachings disclosed herein.

FIG. 17 is an example communication flow 1700 for improved sensing in unicast sidelink communication, in accordance with one or more of the teachings disclosed herein. According to the call flow 1700, a sidelink communication between UE pairs is provided, a first of which may include a first UE 1704*a* and a second UE 1704*b* and a second of which may include the first UE 1704*a* and a third UE 1704*c*. In the context of FIG. 1, each of the UEs 1704*a*, 1704*b*, 1704*c* may be implemented as one of the UEs 104. In the context of FIG. 3, each of the UEs 1704*a*, 1704*b* may be implemented as the UE 310 and the UE 1704*c* may be implemented as the UE 350.

For sidelink communication, the UEs 1704*a*, 1704*b*, 1704*c* may directly communicate with one another over a sidelink. Examples of such a sidelink may include the PC5 interfaces defined for V2X in LTE and/or 5G NR. Communication on the sidelink may be carried on at least one channel.

On the sidelink, control information may be carried on a sidelink control channel 1710*a*, such as the PSCCH. Data on the sidelink, however, may be carried on a sidelink data channel 1710*b*, which may also be referred to as a sidelink shared channel. An example of the sidelink data channel 1710*b* may include the PSSCH.

To directly receive data on the sidelink data channel 1710*b*, the data may be scheduled on a set of resources on the sidelink data channel 1710*b*. Scheduling information for the data on the sidelink data channel 1710*b* may be carried on the sidelink control channel 1710*a*. Thus, in order to directly communicate data on the sidelink data channel 1710*b*, each of the UEs 1704*a*, 1704*b*, 1704*c* may first receive and decode the sidelink control channel 1710*a*.

For the sidelink communication on the allocated set of resources 1732, each of the UEs 1704*a*, 1704*b*, 1704*c* may identify another one of the UEs 1704*a*, 1704*b*, 1704*c*, e.g., in order to establish a UE pair for sidelink communication. The UEs 1704*a*, 1704*b*, 1704*c* may identify another one of the UEs 1704*a*, 1704*b*, 1704*c* with which to engage in sidelink communication based on the discovery phase. The discovery phase may occur on a sidelink discovery channel (e.g., PSDCH), on which one of the UEs 1704*a*, 1704*b*, 1704*c* may announce a service provided by that one of the UEs 1704*a*, 1704*b*, 1704*c* while another one of the UEs 1704*a*, 1704*b*, 1704*c* may determine that the announced service is of interest to that other one of the UEs 1704*a*, 1704*b*, 1704*c*.

In the aspects illustrated by FIG. 17, the second UE 1704*b* may have sidelink data 1724 to send to the first UE 1704*a*, and the first UE 1704*a* may have sidelink data 1742 to send to the third UE 1704*c*. In order to send data on the sidelink, the first UE 1704*a* and the second UE 1704*b* may determine respective control information 1722, 1740 associated with the sidelink data channel 1710*b*.

The control information 1722, 1740 may enable the first UE 1704*a* and the third UE 1704*c*, respectively, to successfully detect and decode the data on the sidelink data channel 1710*b* from the second UE 1704*b* and the first UE 1704*a*. For example, the control information 1722, 1740 may indicate at least one of a schedule for receiving data on the sidelink data channel 1710*b*, an MCS for communication on the sidelink data channel 1710*b*, information associated with a HARQ process for the sidelink data channel 1710*b*, a set of resources allocated on the sidelink data channel 1710*b* to carry the data, and/or a TCI state associated with the sidelink data channel 1710*b*.

At 1720, the second UE 1704*b* may generate a resource reservation. For example, the second UE 1704*b* may allocate a set of resources for sidelink communication with a fourth UE (not shown). By allocating the set of resources for sidelink communication, the first UE 1704*b* may reduce or prevent conflicts, interference, and the link on resources in the cell. The set of resources may include a set of PRBs and/or time/frequency resources. Sidelink communication may occur in a mmW spectrum and/or near-mmW spectrum. For example, one or more 3GPP standards for 5G NR may define communication in mmW and/or near-mmW frequencies.

During one or more slots configured for transmission by the second UE 1704*b*, the second UE 1704*b* may send the sidelink control information 1722 to the first UE 1704*a* on the sidelink control channel 1710*a*. The first UE 1704*a* may be monitoring a set of resources allocated for the sidelink control channel 1710*a*.

The second UE 1704*b* may directly send the sidelink data 1724 on the sidelink data channel 1710*b* to the first UE 1704*a*. The second UE 1704*b* may send the sidelink data 1724 on the sidelink data channel 1710*b* based on the sidelink control information 1722. For example, the second UE 1704*b* may send the sidelink data 1724 on the sidelink data channel 1710*b* according to a schedule indicated in the sidelink control information 1722.

At 1730, the first UE 1704*a* may successfully detect and decode the sidelink control information 1722. Based on the sidelink control information 1722, the first UE 1704*a* may successfully receive and decode the sidelink data 1726 on the sidelink data channel 1710*b*. For example, the first UE 1704*a* may decode an SCI that indicates a resource reservation of the second UE 1704*b*.

At 1732, the first UE 1704*a* may obtain one or more measurements of the sidelink data 1724. For example, the first UE 1704*a* may obtain RSRP measurements. In some aspects, the first UE 1704*a* may determine that the one or more RSRP measurements exceed a reference threshold, which may indicate that the first UE 1704*a* and the second UE 1704*b* are located nearby one another and/or the second UE 1704*b* is transmitting at a high transmission power that can cause co-channel interference to the first UE 1704*a*.

At 1734, the first UE 1704a decodes the first-stage SCI within the sidelink control information 1722. In some aspects, the first UE 1704a decodes the first-stage SCI (SCI-1) and the second-stage SCI (e.g., SCI-2). In this regard, the first UE 1704a may determine a transmitter cast type of the second UE 1704b based on the decoded first and second stages of the SCI. The first UE 1704a may obtain various parameters from the sidelink control information 1722 for sidelink communication on the sidelink data channel 1710b, such as a schedule for receiving the sidelink data 1724 (e.g., PSSCH) on the sidelink data channel 1710b. In some aspects, the first UE 1704a may perform blind-decoding of all subchannels to identify the sidelink control information 1722 and decode the sidelink control information 1722.

At 1736, the first UE 1704a may determine that the first-stage SCI includes an indication that the second UE 1704b is following a resource recommendation of the fourth UE (not shown) that is an intended receiver of the second UE 1704b.

At 1738, the first UE 1704a may decide to ignore the resource reservation of the second UE 1704b based on its determination that the second UE 1704b is following its receiver's resource recommendation and/or its transmitter cast type is unicast, although the measured RSRP values are determined to exceed the threshold. In this regard, the first UE 1704a may generate a sidelink transmission to the third UE 1704c.

During the set of slots configured for transmission by the first UE 1704a according to the sidelink control information 1722, the first UE 1704a may send the sidelink control information 1740 to the third UE 1704c on the sidelink control channel 1710a. The third UE 1704c may be monitoring a set of resources allocated for the sidelink control channel 1710a.

Subsequently, the first UE 1704a may directly send sidelink data 1742 on the sidelink data channel 1710b to the third UE 1704c. The first UE 1704a may send the sidelink data 1742 on the sidelink data channel 1710b based on the sidelink control information 1740. For example, the first UE 1704a may send the sidelink data 1742 on the sidelink data channel 1710b according to a schedule indicated in the sidelink control information 1740.

In a set of slots configured according to the sidelink control information 1740, the third UE 1704c may successfully detect and decode the sidelink control information 1740 on the sidelink control channel 1710a. The third UE 1704c may obtain various parameters from the sidelink control information 1740 for sidelink communication on the sidelink data channel 1710b, such as a schedule for receiving the sidelink data 1742 on the sidelink data channel 1710b.

Figure 18:
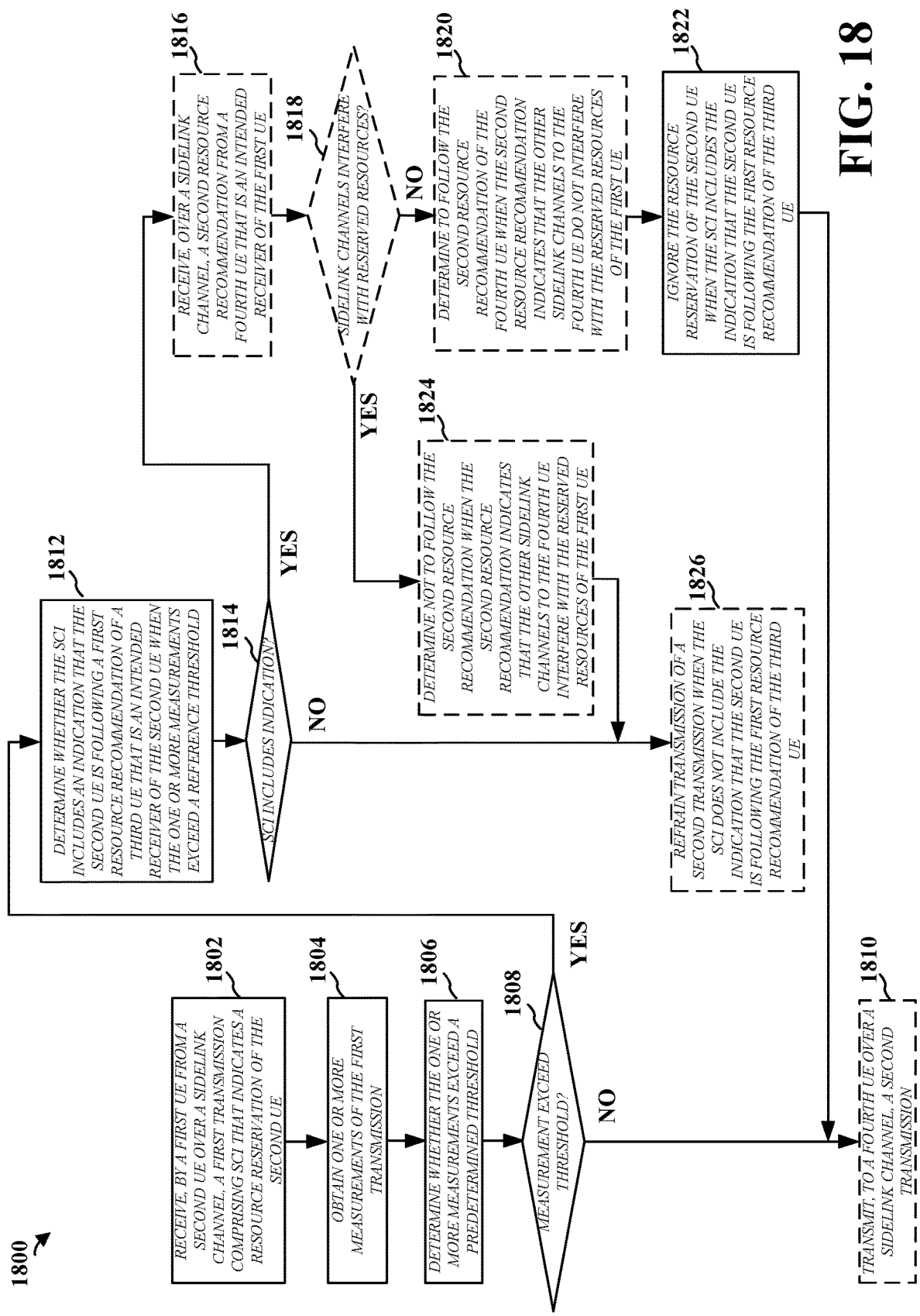
FIG. 18 is a flowchart of a process of wireless communication, in accordance with one or more of aspects of the present disclosure.

FIG. 18 is a flowchart of a process 1800 of wireless communication. The process 1800 may be performed by a wireless communication device (e.g., the UE 104, 402, 404, 406, 408; the device 310 or 350, the RSU 107, 407, the devices 721, 821, 921, 1021, 1121, 1221, 1321, 1421, 1521, 1621, 1704a, 1704b, 1704c; the apparatus 1902', which may include memory, a cellular baseband processor, and one or more components configured to perform the process 1800). As illustrated, the process 1800 includes a number of enumerated steps, but embodiments of the process 1800 may include additional steps before, after, and in between the enumerated steps. In some embodiments, one or more of the enumerated steps may be omitted or performed in a different order. Optional aspects are illustrated with a dashed line.

As discussed above, issues in transmission protection may arise in mixed cast type sidelink environments (e.g., groupcast and unicast). For example, a groupcast transmission within sidelink networks may receive insufficient protection, where a first sidelink transmitter in a unicast configuration may obtain receiver-side sensing information of its receiver and deemphasize transmitter-side sensing by ignoring the transmitter-side sensing of a second sidelink transmitter in a groupcast configuration, which may lead to an occurrence of actual interference between the sidelink transmitters. This de-emphasis in transmitter-side sensing is undesirable as it results in lesser protection to transmitters in mixed cast type networks.

In this regard, the subject technology provides for facilitating improvement in sensing for unicast sidelink communication by allowing a UE to transmit its sidelink signaling to its intended sidelink receivers at a same time as another sidelink transmitter without deemphasizing in transmitter-side sensing information. In some aspects, the UE can ignore a resource reservation included in an incoming first-stage SCI (e.g., SCI-1) if the UE is following its sidelink receiver (or other UE) recommendation and the SCI-1 indicates that the other sidelink transmitter is following its receiver (or other UE) recommendation. In other aspects, the UE can ignore resource reservation information included in the incoming SCI-1 if the sensed transmitter UE is following its receiver (or other UE) recommendation and the SCI-1 transmitter cast type is unicast. In some aspects, the UE may decode both SCI-1 and SCI-2 to determine the transmitter cast type. In still other aspects, the UE can ignore the resource reservation included in incoming SCI-1 based primarily on the indication that the other sidelink transmitter is following its receiver (or other UE) recommendation.

The process 1800 enables a wireless communication device to provide sidelink control information with an indication of whether a sidelink transmitter is following a resource recommendation of its intended sidelink receiver (or other sidelink UE) and/or an indication of a transmitter cast type (e.g., unicast, groupcast). By providing this sidelink control information in an effort to improve the sidelink channel sensing in unicast communications, a UE can be allowed to transmit its sidelink signaling to its intended sidelink receivers at a same time as another sidelink transmitter (even though the sidelink transmitters may be nearby one another) without wasting resources. For example, the number of excluded resources used in initial and/or retransmissions can be reduced. Further, the amount of power consumption by the sidelink transmitting UE(s) can be reduced.

At 1802, the UE may receive, from a second UE over a sidelink channel, a first transmission that includes a SCI indicating a resource reservation of the second UE. For example, 1802 may be performed by the reception component 1904 of FIG. 19. In the context of FIGS. 1 and 17, the UE 104/1704a may receive the first transmission.

At 1804, the UE may obtain one or more measurements of the first transmission. For example, 1804 may be performed by the measurement component 1908 of FIG. 19. In the context of FIGS. 1 and 17, the UE 104/1704a may obtain the measurements.

At 1806, the UE may determine whether the one or more measurements exceed a reference threshold. For example, 1806 may be performed by the determination component 1910 of FIG. 19. In the context of FIGS. 1 and 17, the UE 104/1704a may perform the comparison between the reference threshold and the obtained RSRP measurements.

At 1808, the UE performs the comparison between the obtained measurements and the reference threshold. In some aspects, if the UE determines that the measurements exceed the threshold, then process 1800 may proceed to block 1812. Otherwise, the process 1800 proceeds to block 1810 when the measurements do not exceed the threshold.

At 1812, the UE may determine whether the SCI includes an indication that the second UE is following a first resource recommendation of a third UE that is an intended receiver of the second UE when the one or more measurements exceed the reference threshold. For example, 1812 may be performed by the determination component 1910 of FIG. 19. In the context of FIGS. 1 and 17, the UE 104/1704a may scan the SCI-1 for the indication.

At 1814, the UE performs the decoding of the SCI to identify whether the indication is present within the SCI, particularly within the first stage SCI (SCI-1). In some aspects, if the UE determines that the indication of the second UE is following its receiver's recommendation is present, then process 1800 may proceed to block 1816. Otherwise, the process 1800 proceeds to block 1826 when the indication is not present within the SCI.

At 1816, the UE may receive, over a sidelink channel, a second resource recommendation from a fourth UE that is an intended receiver of the first UE. In some aspects, the channel sensing information includes one or more measurements of one or more sidelink channels to the fourth UE, in which the one or more measurements may indicate whether the one or more sidelink channels interfere with reserved resources of the first UE. For example, 1816 may be performed by the reception component 1904 of FIG. 19. In the context of FIGS. 1 and 17, the UE 104/1704a may receive the second resource recommendation.

At 1818, the UE may determine whether the one or more sidelink channels to the fourth UE interfere with the reserved resources of the first UE. In some aspects, if the UE determines that the sidelink channels do interfere with its reserved resources, then process 1800 may proceed to block 1824. Otherwise, the process 1800 proceeds to block 1820 when the sidelink channels do not interfere with the reserved resources of the first UE. For example, 1818 may be performed by the determination component 1910 of FIG. 19. In the context of FIGS. 1 and 17, the UE 104/1704a may determine any channel interference from the information received from the UE 1704c, for example.

At 1820, the UE determines to follow the second resource recommendation of the fourth UE when the one or more measurements indicate that the one or more sidelink channels do not interfere with the reserved resources of the first UE. Alternatively, at 1824, the UE determines not to follow the second resource recommendation of the fourth UE when the one or more measurements indicate that the one or more sidelink channels interfere with the reserved resources of the first UE. For example, 1820/1824 may be performed by the resource sensing control component 1912 of FIG. 19. In the context of FIGS. 1 and 17, the UE 104/1704a may decide to following its receiver's resource recommendation.

At 1822, the UE may ignore the resource reservation of the second UE when the first UE determines to follow the second resource recommendation and the SCI includes the indication that the second UE is following the first resource recommendation of the third UE. For example, 1822 may be performed by the resource sensing control component 1912 of FIG. 19. In the context of FIGS. 1 and 17, the UE 104/1704a may ignore the resource reservation it received from another transmitting UE, such as UE 1704b.

Referring back to 1826, the UE may refrain transmission of a second transmission when the one or more measurements exceed the reference threshold and the SCI does not include the indication that the UE is following the resource recommendation of the third UE. Alternatively, the UE may refrain the transmission of the second transmission when the measurements exceed the threshold and/or the UE decides not to follow the second resource recommendation from its own receiver.

Referring back to 1810, the UE may transmit, over a sidelink channel, a second transmission to a fourth UE that is an intended receiver of the first UE when the second UE is following its receiver's recommendation and the first UE is also following its own receiver's recommendation. Alternatively, the UE may transmit the second transmission to the fourth UE when the one or more measurements do not exceed the threshold. For example, 1810 may be performed by the transmission component 1906 of FIG. 19. In the context of FIGS. 1 and 17, the UE 104/1704a may transmit the second transmission to a fourth UE, such as UE 1704c.

Figure 19:
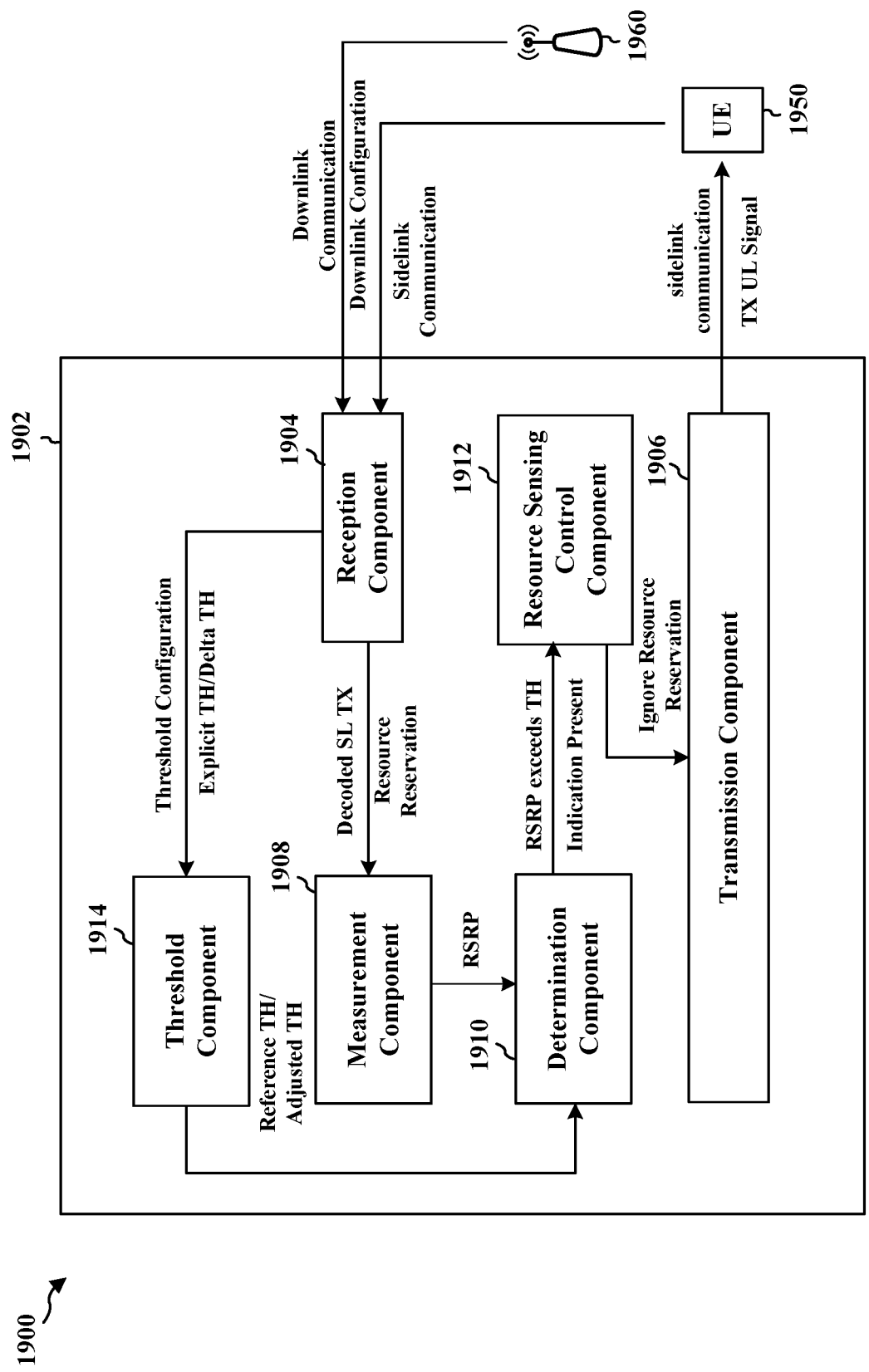
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a UE (e.g., UE 104, 350, 402, 404, 406, 408, 721, 821, 921, 1021, 1121, 1221, 1321, 1421, 1521, 1621, 1704a, 1704b, 1704c, 1902, 2000; RSU 107, 407) in wireless communication with user equipment 1950 over a sidelink channel or with base station 1960 over a downlink/uplink channel.

The apparatus includes a reception component 1904 that receives sidelink communication from the user equipment 1950 and/or downlink communication from the base station 1960. The reception component 1904 may be configured to receive signals and/or other information from other devices including, e.g., user equipment 1950, base station 1960. The signals/information received by the reception component 1904 may be provided to one or more components of the apparatus 1902 for further processing and use in performing various operations in accordance with the methods discussed supra including the processes of the aforementioned flowchart 1800. Thus, via the reception component 1904, the apparatus 1902 and/or one or more components therein receive signals and/or other information (e.g., such as sidelink data and/or downlink data for the apparatus 1902 and/or other control signaling) from the base station 1960 as discussed supra and also discussed more specifically infra. In some aspects, the reception component 1904 is configured to receive, from a second UE over a sidelink channel, a first transmission that includes a SCI indicating a resource reservation of the second UE, e.g., as described in connection with block 1802 of FIG. 18. In some aspects, the reception component 1904 also is configured to receive, over a sidelink channel, a second resource recommendation from a fourth UE that is an intended receiver of the first UE, e.g., as described in connection with block 1816 of FIG. 18. In some aspects, the second resource recommendation indicates channel sensing information associated with the fourth UE. In some aspects, the reception component 1904 is also configured to decode a first portion of the SCI and a second portion of the SCI. In some aspects, In some aspects, the reception component 1904 is also configured to receive, from a base station over a downlink channel, a configuration indicating a plurality of thresholds. In other aspects, the reception component 1904 may receive a configuration indicating a threshold delta value. In one or more implementations, the reception component 1904 may be implemented, for example, in the RX processor 356 with reference to FIG. 3. In other implementations, the reception component 1904 may be implemented, for example, in the RX processor 370 with reference to FIG. 3.

The apparatus includes a measurement component 1908 configured to obtain one or more measurements of the first transmission, e.g., as described in connection with block 1804 of FIG. 18. For example, the measurement component 1908 may obtain RSRP values of the first transmission. In some aspects, the measurement component 1908 is also configured to determine whether the one or more measurements exceed a reference threshold, e.g., as described in connection with block 1806 of FIG. 18. In one or more implementations, the measurement component 1908 may be implemented, for example, in any combination of the RX processor 356, the TX processor 368, and/or the controller/processor 359 with reference to FIG. 3. In other implementations, the measurement component 1908 may be implemented, for example, in any combination of the RX processor 370, the TX processor 316, and/or the controller/processor 375 with reference to FIG. 3.

The apparatus includes a determination component 1910 configured to determine whether the SCI includes an indication that the second UE is following a first resource recommendation of a third UE that is an intended receiver of the second UE when the one or more measurements exceed the reference threshold, e.g., as described in connection with block 1812 of FIG. 18. In some aspects, the determination component 1910 is also configured to determine a transmitter cast type of the second UE based on the decoded first and second portions of the SCI. In one or more implementations, the determination component 1910 may be implemented, for example, in any combination of the RX processor 356, the TX processor 368, and/or the controller/processor 359 with reference to FIG. 3. In other implementations, the determination component 1910 may be implemented, for example, in any combination of the RX processor 370, the TX processor 316, and/or the controller/processor 375 with reference to FIG. 3.

The apparatus includes a resource sensing control component 1912 configured to ignore the resource reservation of the second UE when the first UE determines to follow the second resource recommendation and the SCI includes the indication that the second UE is following the first resource recommendation of the third UE, e.g., as described in connection with block 1822 of FIG. 18. In some aspects, the resource sensing control component 1912 may ignore the resource reservation of the second UE when the transmitter cast type of the second UE is unicast and the first portion of the SCI includes the indication that the UE is following the resource recommendation of the third UE. In some aspects, the resource sensing control component 1912, in coordination with the transmission component 1906, may refraining transmission of a second transmission when the one or more measurements exceed the reference threshold and the SCI does not include the indication that the UE is following the resource recommendation of the third UE, e.g., as described in connection with block 1826 of FIG. 18. In one or more implementations, the resource sensing control component 1912 may be implemented, for example, in any combination of the TX processor 368 and/or the controller/processor 359 with reference to FIG. 3. In other implementations, the resource sensing control component 1912 may be implemented, for example, in any combination of the TX processor 316 and/or the controller/processor 375 with reference to FIG. 3.

The apparatus includes a threshold component 1914 configured to receive, through the, the reception component 1904, the configuration indicating a plurality of thresholds. In some aspects, the reference threshold is preconfigured at the first UE. In some aspects, the reference threshold corresponds to RSRP value. In some aspects, the plurality of thresholds includes a first threshold and a second threshold greater than the first threshold. In some aspects, the first transmission is associated with a first resource reservation priority and a second transmission to a fourth UE that is an intended receiver of the first UE is associated with a second resource reservation priority different than the first resource reservation priority. In some aspects, the threshold component 1914 is configured to select a first threshold from the plurality of thresholds when the first resource reservation priority is greater than the second resource reservation priority. In some aspects, the threshold component 1914, in coordination with the determination component 1910 may determine whether the one or more measurements exceed the first threshold. In other aspects, the threshold component 1914 is also configured to select a second threshold from the plurality of thresholds when the second resource reservation priority is greater than the first resource reservation priority. In some aspects, the threshold component 1914, in coordination with the determination component 1910, may determine whether the one or more measurements exceed the second threshold. In some aspects, the threshold component 1914 may generate an adjusted threshold by adjusting the reference threshold by the threshold delta value. In some aspects, the threshold component 1914, in coordination with the determination component 1910, may determine whether the one or more measurements exceed the adjusted threshold. In some examples, the threshold component 1914 may select a first threshold delta value from the plurality of threshold delta values when the first resource reservation priority is greater than the second resource reservation priority, and generate a first adjusted threshold by adjusting the reference threshold by the first threshold delta value. In some aspects, the threshold component 1914, in coordination with the determination component 1910, may determine whether the one or more measurements exceed the first adjusted threshold. In other examples, the threshold component 1914 may select a second threshold delta value from the plurality of threshold delta values when the second resource reservation priority is greater than the first resource reservation priority, and generate a second adjusted threshold by adjusting the reference threshold by the second threshold delta value. In some aspects, the threshold component 1914, in coordination with the determination component 1910, may determine whether the one or more measurements exceed the second adjusted threshold. In one or more implementations, the threshold component 1914 may be implemented, for example, in any combination of the RX processor 356, the TX processor 368, and/or the controller/processor 359 with reference to FIG. 3. In other implementations, the threshold component 1914 may be implemented, for example, in any combination of the RX processor 370, the TX processor 316, and/or the controller/processor 375 with reference to FIG. 3.

The apparatus includes a transmission component 1906 that transmits uplink communication to the base station 1960. The transmission component 1906 may be configured to transmit various messages to one or more external devices, e.g., including the base station 1960, in accordance with the methods disclosed herein. The messages/signals to be transmitted may be generated by one or more other components as discussed above, or the messages/signals to be transmitted may be generated by the transmission component 1906 under the direction/control of the one or more other components discussed supra. Thus, in various configurations, via the transmission component 1906, the apparatus 1902 and/or one or more components therein transmit signals and/or other information (e.g., such as uplink data, control messages and/or other signals) to external devices such as the base station 1960. In some aspects, the transmission component 1906 is configured to communicate, on a subband (e.g., a set of consecutive subchannels) over a sidelink channel, a second transmission to a fourth UE that is an intended receiver of the first UE based on the resource reservation of the second UE being ignored, e.g., as described in connection with blocks 1822 and 1826 of FIG. 18. In other aspects, the transmission component 1906 is configured to transmit, over a sidelink channel, the second transmission to the fourth UE when the one or more measurements do not exceed the threshold, e.g., as described in connection with blocks 1814 and 1826 of FIG. 18. In some aspects, the transmission component 1906 is configured to communicate, with one or more UEs over respective sidelink channels, SCI information in a first portion of the SCI in a second transmission. In some aspects, the transmission component 1906 is configured to communicate, with the one or more UEs over the respective sidelink channels, an indication of a transmitter cast type of the first UE in a second portion of the SCI in the second transmission. In one or more implementations, the transmission component 1906 may be implemented, for example, in the TX processor 368 with reference to FIG. 3. In other implementations, the transmission component 1906 may be implemented, for example, in the TX processor 316 with reference to FIG. 3.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
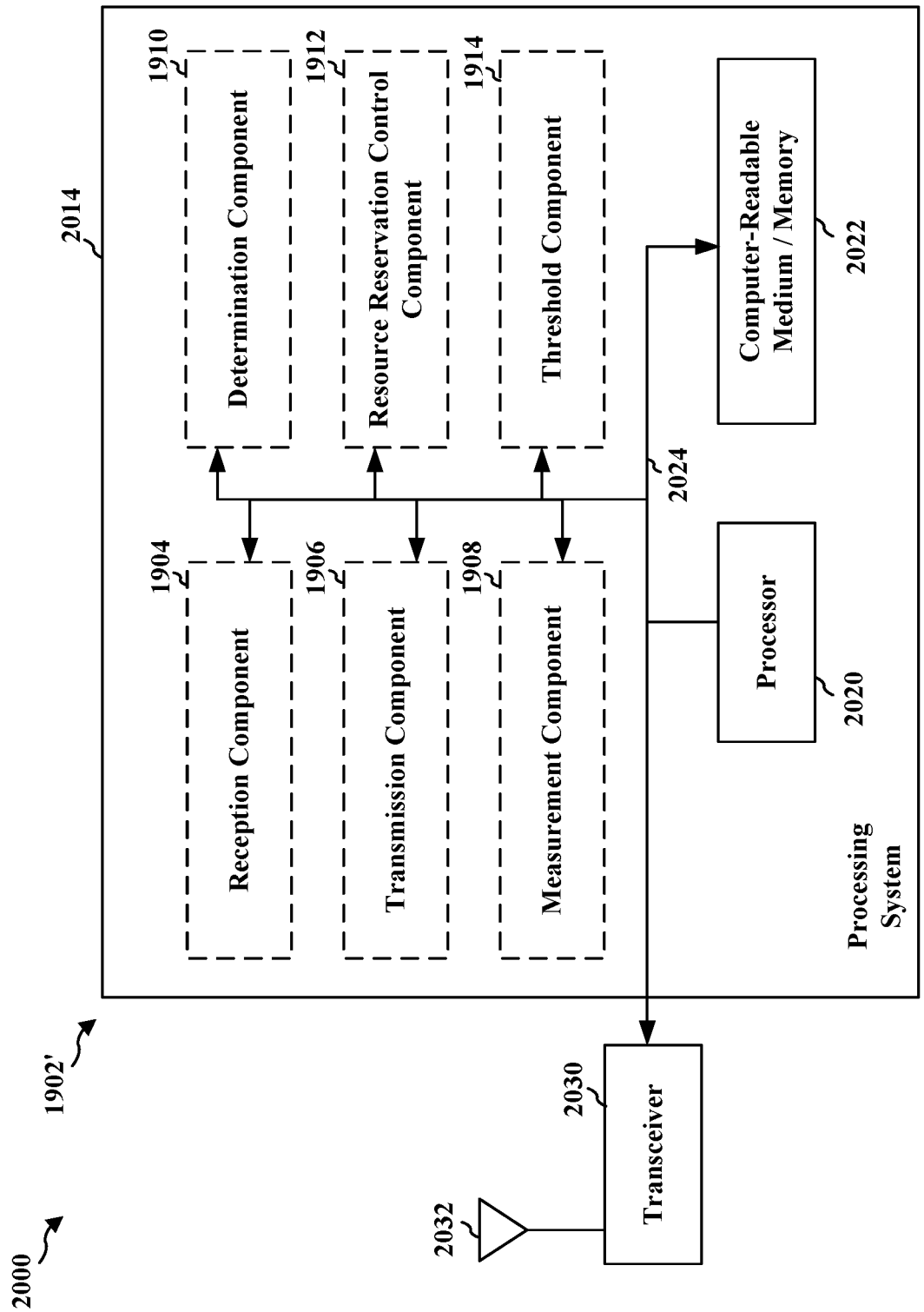
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2020, the components 1904, 1906, 1908, 1910, 1912, 1914, and the computer-readable medium/memory 2022. The bus 2024 may also link various other circuits such as timing sources, peripherals, voltage regulators, and power management circuits, which are well known in the art, and therefore, will not be described any further.

The processing system 2014 may be coupled to a transceiver 2030. The transceiver 2030 is coupled to one or more antennas 2032. The transceiver 2030 provides a means for communicating with various other apparatus over a transmission medium. The transceiver 2030 receives a signal from the one or more antennas 2032, extracts information from the received signal, and provides the extracted information to the processing system 2014, specifically the reception component 1904. In addition, the transceiver 2030 receives information from the processing system 2014, specifically the transmission component 1906, and based on the received information, generates a signal to be applied to the one or more antennas 2032. The processing system 2014 includes a processor 2020 coupled to a computer-readable medium/memory 2022. The processor 2020 is responsible for general processing, including the execution of software stored on the computer-readable medium/memory 2022. The software, when executed by the processor 2020, causes the processing system 2014 to perform the various functions described supra for any particular apparatus. The computer-readable medium/memory 2022 may also be used for storing data that is manipulated by the processor 2020 when executing software. The processing system 2014 further includes at least one of the components 1904, 1906, 1908, 1910, 1912, 1914. The components may be software components running in the processor 2020, resident/stored in the computer readable medium/memory 2022, one or more hardware components coupled to the processor 2020, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for receiving, from a second UE over a sidelink channel, a first transmission comprising SCI indicating a resource reservation of the second UE. The apparatus 1902/1902' also includes means for obtaining one or more measurements of the first transmission. The apparatus 1902/1902' also includes means for determining whether the one or more measurements exceed a reference threshold. The apparatus 1902/1902' also includes means for determining whether the SCI includes an indication that the second UE is following a first resource recommendation of a third UE that is an intended receiver of the second UE when the one or more measurements exceed the reference threshold. The apparatus 1902/1902' also includes means for ignoring the resource reservation of the second UE when the SCI includes the indication that the UE is following the first resource recommendation of the third UE. The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following Aspects are illustrative only and may be combined with aspects of other embodiments or teachings described herein, without limitation.

Aspect 1 is a method of wireless communication performed at a first user equipment that includes receiving, from a second UE over a sidelink channel, a first transmission comprising sidelink control information (SCI), the SCI indicating a resource reservation of the second UE; obtaining one or more measurements of the first transmission; determining whether the one or more measurements exceed a reference threshold; determining whether the SCI includes an indication that the second UE is following a first resource recommendation of a third UE that is an intended receiver of the second UE when the one or more measurements exceed the reference threshold; and ignoring the resource reservation of the second UE when the SCI includes the indication that the UE is following the first resource recommendation of the third UE.

In Aspect 2, the method of Aspect 1 further includes receiving, over a sidelink channel, a second resource recommendation from a fourth UE that is an intended receiver of the first UE, the second resource recommendation indicating channel sensing information associated with the fourth UE, wherein the channel sensing information comprises one or more measurements of one or more sidelink channels to the fourth UE, wherein the one or more measurements indicate whether the one or more sidelink channels interfere with reserved resources of the first UE; and determining to follow the second resource recommendation of the fourth UE when the one or more measurements indicate that the one or more sidelink channels do not interfere with the reserved resources of the first UE.

In Aspect 3, the method of Aspect 1 further includes receiving, over a sidelink channel, a second resource recommendation from a fourth UE that is an intended receiver of the first UE, the second resource recommendation indicating channel sensing information associated with the fourth UE, wherein the channel sensing information comprises one or more measurements of one or more sidelink channels to the fourth UE, wherein the one or more measurements indicate whether the one or more sidelink channels interfere with reserved resources of the first UE; and determining not to follow the second resource recommendation of the fourth UE when the one or more measurements indicate that the one or more sidelink channels interfere with the reserved resources of the first UE.

In Aspect 4, the method of Aspect 2 further includes that the ignoring the resource reservation comprises ignoring the resource reservation of the second UE when the first UE determines to follow the second resource recommendation and the SCI includes the indication that the second UE is following the first resource recommendation of the third UE.

In Aspect 5, the method of any of Aspects 2 or 4 further includes generating SCI information with an indication that the first UE is following the second resource recommendation of the fourth UE when the one or more measurements indicate that the one or more sidelink channels do not interfere with the reserved resources of the first UE.

In Aspect 6, the method of any of Aspects 1-5 further includes communicating, with one or more UEs over respective sidelink channels, the SCI information in a first portion of the SCI in a second transmission.

In Aspect 7, the method of Aspect 6 further includes communicating, with the one or more UEs over the respective sidelink channels, an indication of a transmitter cast type of the first UE in a second portion of the SCI in the second transmission.

In Aspect 8, the method of any of Aspects 1-7 further includes decoding a first portion of the SCI and a second portion of the SCI; and determining a transmitter cast type of the second UE based on the decoded first and second portions of the SCI, wherein the ignoring the resource reservation comprises ignoring the resource reservation of the second UE when the transmitter cast type of the second UE is unicast and the first portion of the SCI includes the indication that the UE is following the resource recommendation of the third UE.

In Aspect 9, the method of any of Aspects 1-8 further includes refraining transmission of a second transmission when the one or more measurements exceed the reference threshold and the SCI does not include the indication that the UE is following the resource recommendation of the third UE.

In Aspect 10, the method of any of Aspects 1-9 further includes that the reference threshold is preconfigured at the first UE.

In Aspect 11, the method of any of Aspects 1-10 further includes that the reference threshold corresponds to a reference signal received power (RSRP) value.

In Aspect 12, the method of any of Aspects 1-11 further includes that the first transmission is associated with a first resource reservation priority and a second transmission to a fourth UE that is an intended receiver of the first UE is associated with a second resource reservation priority different than the first resource reservation priority.

In Aspect 13, the method of any of Aspects 1-12 further includes receiving, from a base station over a downlink channel, a configuration indicating a plurality of thresholds, the plurality of thresholds comprising a first threshold and a second threshold greater than the first threshold.

In Aspect 14, the method of Aspect 13 further includes selecting the first threshold from the plurality of thresholds when the first resource reservation priority is greater than the second resource reservation priority, wherein the determining whether the one or more measurements exceed a threshold comprises determining whether the one or more measurements exceed the first threshold.

In Aspect 15, the method of Aspect 13 further includes selecting the second threshold from the plurality of thresholds when the second resource reservation priority is greater than the first resource reservation priority, wherein the determining whether the one or more measurements exceed a threshold comprises determining whether the one or more measurements exceed the second threshold.

In Aspect 16, the method of any of Aspects 1-15 further includes receiving, from a base station over a downlink channel, a configuration indicating a threshold delta value; and generating an adjusted threshold by adjusting the reference threshold by the threshold delta value, wherein the adjusted threshold is greater than the reference threshold, wherein the determining whether the one or more measurements exceed a threshold comprises determining whether the one or more measurements exceed the adjusted threshold.

In Aspect 17, the method of any of Aspects 1-15 further includes receiving, from a base station over a downlink channel, a configuration indicating a plurality of threshold delta values, the plurality of threshold delta values comprising a first threshold delta value and a second threshold delta value greater than the first threshold delta value.

In Aspect 18, the method of Aspect 17 further includes selecting the first threshold delta value from the plurality of threshold delta values when the first resource reservation priority is greater than the second resource reservation priority; and generating a first adjusted threshold by adjusting the reference threshold by the first threshold delta value, wherein the determining whether the one or more measurements exceed a threshold comprises determining whether the one or more measurements exceed the first adjusted threshold.

In Aspect 19, the method of Aspect 17 further includes selecting the second threshold delta value from the plurality of threshold delta values when the second resource reservation priority is greater than the first resource reservation priority; and generating a second adjusted threshold by adjusting the reference threshold by the second threshold delta value, wherein the determining whether the one or more measurements exceed a threshold comprises determining whether the one or more measurements exceed the second adjusted threshold.

In Aspect 20, the method of any of Aspects 1-19 further includes communicating, on a subband over a sidelink channel, a second transmission to a fourth UE that is an intended receiver of the first UE based on the resource reservation of the second UE being ignored.

In Aspect 21, the method of Aspect 20 further includes that the subband comprises a plurality of physical sidelink control channels (PSCCHs), multiplexed in time or frequency, and the communicating the second transmission comprises transmitting, on the subband to the fourth UE over the sidelink channel, the second transmission in a first PSCCH of the plurality of PSCCHs.

In Aspect 22, the method of any of Aspects 1-21 further includes transmitting, over a sidelink channel, a second transmission to a fourth UE that is an intended receiver of the first UE when the one or more measurements do not exceed the threshold.

In Aspect 23, the method of any of Aspects 1-22 further includes that the first UE has a first transmitter cast type and the second UE has a second transmitter cast type different than the first transmitter cast type.

In Aspect 24, the method of Aspect 23 further includes that the first transmitter cast type is a unicast transmitter and the second transmitter cast type is a groupcast transmitter.

In Aspect 25, the method of Aspect 23 further includes that the first transmitter cast type is a groupcast transmitter and the second transmitter cast type is a unicast transmitter.

Aspect 26 is a method of wireless communication performed at a first user equipment that includes receiving, from a second UE over a sidelink channel, a first transmission comprising sidelink control information (SCI), the SCI indicating a resource reservation of the second UE; determining whether the SCI includes an indication that the second UE is following a first resource recommendation of a third UE that is an intended receiver of the second UE; and ignoring the resource reservation of the second UE when the SCI includes the indication that the UE is following the first resource recommendation of the third UE.

Aspect 27 is a device including one or more processors and one or more memories in electronic communication with the one or more processors storing instructions executable by the one or more processors to cause a system or an apparatus to implement a method as in any of Aspects 1 to 26.

Aspect 28 is a system or apparatus including means for implementing a method or realizing an apparatus as in any of Aspects 1 to 26.

Aspect 29 is a non-transitory computer-readable medium storing instructions executable by one or more processors to cause the one or more processors to implement a method as in any of Aspects 1 to 26.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed at a first user equipment (UE), the method comprising:
   receiving, from a second UE over a sidelink channel, a first transmission comprising sidelink control information (SCI), the SCI indicating a resource reservation of the second UE;
   determining whether the SCI includes an indication that the second UE is following a first resource recommendation of a third UE that is an intended receiver of the second UE; and
   transmitting, over a sidelink channel, a second transmission to a fourth UE that is an intended receiver of the first UE by ignoring the resource reservation of the second UE based on a determination that the SCI includes the indication that the second UE is following the first resource recommendation of the third UE.

2. The method of claim 1, further comprising:
   receiving, over a sidelink channel, a second resource recommendation from the fourth UE that is an intended receiver of the first UE, the second resource recommendation indicating channel sensing information associated with the fourth UE, wherein the channel sensing information comprises one or more measurements of one or more sidelink channels to the fourth UE, wherein the one or more measurements indicate whether the one or more sidelink channels interfere with reserved resources of the first UE; and
   one of:
      determining to follow the second resource recommendation of the fourth UE when the one or more measurements indicate that the one or more sidelink channels do not interfere with the reserved resources of the first UE; or
      determining not to follow the second resource recommendation of the fourth UE when the one or more measurements indicate that the one or more sidelink channels interfere with the reserved resources of the first UE.

3. The method of claim 2, wherein the ignoring the resource reservation comprises ignoring the resource reservation of the second UE when the first UE determines to follow the second resource recommendation and the SCI includes the indication that the second UE is following the first resource recommendation of the third UE.

4. The method of claim 2, further comprising:
generating SCI information with an indication that the first UE is following the second resource recommendation of the fourth UE when the one or more measurements indicate that the one or more sidelink channels do not interfere with the reserved resources of the first UE, further comprising:
communicating, with one or more UEs over respective sidelink channels, the SCI information in a first portion of the SCI in a second transmission; and
communicating, with the one or more UEs over the respective sidelink channels, an indication of a transmitter cast type of the first UE in a second portion of the SCI in the second transmission.

5. The method of claim 1, further comprising:
decoding a first portion of the SCI and a second portion of the SCI; and
determining a transmitter cast type of the second UE based on the decoded first and second portions of the SCI,
wherein the ignoring the resource reservation comprises ignoring the resource reservation of the second UE when the transmitter cast type of the second UE is unicast and the first portion of the SCI includes the indication that the UE is following the first resource recommendation of the third UE.

6. The method of claim 1, further comprising:
obtaining one or more measurements of the first transmission; and
determining whether the one or more measurements exceed a reference threshold,
wherein the determining comprises determining whether the SCI includes the indication when the one or more measurements exceed the reference threshold.

7. The method of claim 6, further comprising:
refraining transmission of a second transmission when the one or more measurements exceed the reference threshold and the SCI does not include the indication that the UE is following the first resource recommendation of the third UE.

8. The method of claim 6, wherein the reference threshold is preconfigured at the first UE.

9. The method of claim 6, wherein the reference threshold corresponds to a reference signal received power (RSRP) value.

10. The method of claim 6, wherein the first transmission is associated with a first resource reservation priority and a second transmission to a fourth UE that is an intended receiver of the first UE is associated with a second resource reservation priority different than the first resource reservation priority.

11. The method of claim 10, further comprising:
receiving, from a base station over a downlink channel, a configuration indicating a plurality of thresholds, the plurality of thresholds comprising a first threshold and a second threshold greater than the first threshold.

12. The method of claim 11, further comprising:
selecting the first threshold from the plurality of thresholds when the first resource reservation priority is greater than the second resource reservation priority,
wherein the determining whether the one or more measurements exceed a threshold comprises determining whether the one or more measurements exceed the first threshold.

13. The method of claim 11, further comprising:
selecting the second threshold from the plurality of thresholds when the second resource reservation priority is greater than the first resource reservation priority,
wherein the determining whether the one or more measurements exceed a threshold comprises determining whether the one or more measurements exceed the second threshold.

14. The method of claim 10, further comprising:
receiving, from a base station over a downlink channel, a configuration indicating a threshold delta value; and
generating an adjusted threshold by adjusting the reference threshold by the threshold delta value,
wherein the adjusted threshold is greater than the reference threshold,
wherein the determining whether the one or more measurements exceed a threshold comprises determining whether the one or more measurements exceed the adjusted threshold.

15. The method of claim 10, further comprising:
receiving, from a base station over a downlink channel, a configuration indicating a plurality of threshold delta values, the plurality of threshold delta values comprising a first threshold delta value and a second threshold delta value greater than the first threshold delta value.

16. The method of claim 15, further comprising:
selecting the first threshold delta value from the plurality of threshold delta values when the first resource reservation priority is greater than the second resource reservation priority; and
generating a first adjusted threshold by adjusting the reference threshold by the first threshold delta value,
wherein the determining whether the one or more measurements exceed a threshold comprises determining whether the one or more measurements exceed the first adjusted threshold.

17. The method of claim 15, further comprising:
selecting the second threshold delta value from the plurality of threshold delta values when the second resource reservation priority is greater than the first resource reservation priority; and
generating a second adjusted threshold by adjusting the reference threshold by the second threshold delta value,
wherein the determining whether the one or more measurements exceed a threshold comprises determining whether the one or more measurements exceed the second adjusted threshold.

18. The method of claim 6, further comprising:
transmitting, over the sidelink channel, the second transmission to the fourth UE that is the intended receiver of the first UE when the one or more measurements do not exceed the reference threshold.

19. The method of claim 1, further comprising:
communicating, on a subband over a sidelink channel, a second transmission to a fourth UE that is an intended receiver of the first UE based on the resource reservation of the second UE being ignored, wherein:
the subband comprises a plurality of physical sidelink control channels (PSCCHs), multiplexed in time or frequency, and
the communicating the second transmission comprises transmitting, on the subband to the fourth UE over the sidelink channel, the second transmission in a first PSCCH of the plurality of PSCCHs.

20. The method of claim 1, wherein the first UE has a first transmitter cast type and the second UE has a second transmitter cast type different than the first transmitter cast type.

21. The method of claim 20, wherein the first transmitter cast type is a unicast transmitter and the second transmitter cast type is a groupcast transmitter.

22. The method of claim 20, wherein the first transmitter cast type is a groupcast transmitter and the second transmitter cast type is a unicast transmitter.

23. A first user equipment (UE), comprising:
a transceiver;
at least one processor; and
a memory, coupled to the transceiver and the at least one processor, storing computer executable code, which when executed by the at least one processor, causes the at least one processor to:
receive, from a second UE over a sidelink channel, via the transceiver, a first transmission comprising sidelink control information (SCI), the SCI indicating a resource reservation of the second UE;
determine whether the SCI includes an indication that the second UE is following a first resource recommendation of a third UE that is an intended receiver of the second UE; and
transmit, over a sidelink channel, a second transmission to a fourth UE that is an intended receiver of the first UE by ignoring the resource reservation of the second UE based on a determination that the SCI includes the indication that the second UE is following the first resource recommendation of the third UE.

24. The first UE of claim 23, wherein the code, which when executed by the at least one processor, further causes the at least one processor to:
receive, over a sidelink channel, via the transceiver, a second resource recommendation from the fourth UE that is an intended receiver of the first UE, the second resource recommendation indicating channel sensing information associated with the fourth UE, wherein the channel sensing information comprises one or more measurements of one or more sidelink channels to the fourth UE, wherein the one or more measurements indicate whether the one or more sidelink channels interfere with reserved resources of the first UE;
determine to follow the second resource recommendation of the fourth UE when the one or more measurements indicate that the one or more sidelink channels do not interfere with the reserved resources of the first UE; and
determine not to follow the second resource recommendation of the fourth UE when the one or more measurements indicate that the one or more sidelink channels interfere with the reserved resources of the first UE.

25. The first UE of claim 24, wherein the code causing the at least one processor to ignore the resource reservation further causes the at least one processor to ignore the resource reservation of the second UE when the first UE determines to follow the second resource recommendation and the SCI includes the indication that the second UE is following the first resource recommendation of the third UE.

26. The first UE of claim 24, wherein the code, which when executed by the at least one processor, further causes the at least one processor to:
generate SCI information with an indication that the first UE is following the second resource recommendation of the fourth UE when the one or more measurements indicate that the one or more sidelink channels do not interfere with the reserved resources of the first UE, further comprising:
communicate, with one or more UEs over respective sidelink channels, via the transceiver, the SCI information in a first portion of the SCI in a second transmission; and
communicate, with the one or more UEs over the respective sidelink channels, via the transceiver, an indication of a transmitter cast type of the first UE in a second portion of the SCI in the second transmission.

27. The first UE of claim 23, wherein the code, which when executed by the at least one processor, further causes the at least one processor to:
decode a first portion of the SCI and a second portion of the SCI; and
determine a transmitter cast type of the second UE based on the decoded first and second portions of the SCI,
wherein the ignoring the resource reservation comprises ignoring the resource reservation of the second UE when the transmitter cast type of the second UE is unicast and the first portion of the SCI includes the indication that the UE is following the first resource recommendation of the third UE.

28. The first UE of claim 23, wherein the code, which when executed by the at least one processor, further causes the at least one processor to:
obtain one or more measurements of the first transmission;
determine whether the one or more measurements exceed a reference threshold, wherein the determining comprises determining whether the SCI includes the indication when the one or more measurements exceed the reference threshold; and
refrain transmission of a second transmission when the one or more measurements exceed the reference threshold and the SCI does not include the indication that the UE is following the first resource recommendation of the third UE.

29. A non-transitory computer-readable medium storing computer-executable program code for wireless communication at a first user equipment (UE), the code when executed by at least one processor, causes the at least one processor to:
receive, from a second UE over a sidelink channel, a first transmission comprising sidelink control information (SCI), the SCI indicating a resource reservation of the second UE;
determine whether the SCI includes an indication that the second UE is following a first resource recommendation of a third UE that is an intended receiver of the second UE; and
transmit, over a sidelink channel, a second transmission to a fourth UE that is an intended receiver of the first UE by ignore the resource reservation of the second UE based on a determination that the SCI includes the indication that the second UE is following the first resource recommendation of the third UE.

30. An apparatus for wireless communication at a first user equipment (UE), comprising:
a memory; and
at least one processor coupled to the memory and configured to:

receive, from a second UE over a sidelink channel, a first transmission comprising sidelink control information (SCI), the SCI indicating a resource reservation of the second UE;

determine whether the SCI includes an indication that the second UE is following a first resource recommendation of a third UE that is an intended receiver of the second UE; and transmit, over a sidelink channel, a second transmission to a fourth UE that is an intended receiver of the first UE by ignoring the resource reservation of the second UE based on a determination that the SCI includes the indication that the second UE is following the first resource recommendation of the third UE.

* * * * *